(12) United States Patent
Bookbinder et al.

(10) Patent No.: US 11,360,280 B2
(45) Date of Patent: Jun. 14, 2022

(54) ROLLABLE OPTICAL FIBER RIBBON WITH LOW ATTENUATION, LARGE MODE FIELD DIAMETER OPTICAL FIBER AND CABLE

(71) Applicant: CORNING RESEARCH & DEVELOPMENT CORPORATION, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/172,579

(22) Filed: Feb. 10, 2021

(65) Prior Publication Data

US 2021/0165178 A1 Jun. 3, 2021

Related U.S. Application Data

(63) Continuation of application No. 16/853,892, filed on Apr. 21, 2020, now Pat. No. 10,948,674, which is a
(Continued)

(51) Int. Cl.
*G02B 6/44* (2006.01)

(52) U.S. Cl.
CPC .......... *G02B 6/4404* (2013.01); *G02B 6/448* (2013.01); *G02B 6/4432* (2013.01); *G02B 6/4478* (2013.01); *G02B 6/4434* (2013.01)

(58) Field of Classification Search
None
See application file for complete search history.

(56) References Cited

U.S. PATENT DOCUMENTS

| 5,410,567 A | 4/1995 | Brundage et al. |
| 6,027,062 A | 2/2000 | Bacon et al. |
| (Continued) | | |

FOREIGN PATENT DOCUMENTS

| CN | 102272635 B | 4/2017 |
| TW | I286621 B | 9/2007 |
| WO | 2005/010589 A1 | 2/2005 |

OTHER PUBLICATIONS

International Search Report and Written Opinion of the International Searching Authority; PCT/US2018/044492; dated Oct. 17, 2018; 9 pages; ISA/US Commissioner for Patents.
(Continued)

*Primary Examiner* — Jerry Rahll
(74) *Attorney, Agent, or Firm* — William D. Doyle

(57) ABSTRACT

A rollable optical fiber ribbon utilizing low attenuation, bend insensitive fibers and cables incorporating such rollable ribbons are provided. The optical fibers are supported by a ribbon body, and the ribbon body is formed from a flexible material such that the optical fibers are reversibly movable from an unrolled position to a rolled position. The optical fibers have a large mode filed diameter, such as ≥9 microns at 1310 nm facilitating low attenuation splicing/connectorization. The optical fibers are also highly bend insensitive, such as having a macrobend loss of ≤0.5 dB/turn at 1550 nm for a mandrel diameter of 15 mm.

16 Claims, 22 Drawing Sheets

Related U.S. Application Data continuation of application No. 16/055,773, filed on Aug. 6, 2018, now Pat. No. 10,649,163.

(60) Provisional application No. 62/542,480, filed on Aug. 8, 2017.

(56) References Cited

U.S. PATENT DOCUMENTS

| | | |
|---|---|---|
| 6,178,278 B1 | 1/2001 | Keller et al. |
| 6,584,257 B1 | 6/2003 | Hurley et al. |
| 7,565,820 B2 | 7/2009 | Foster et al. |
| 7,715,675 B2 | 5/2010 | Fabian et al. |
| 7,832,675 B2 | 11/2010 | Bumgarner et al. |
| 8,467,650 B2 | 6/2013 | Overton et al. |
| 8,548,294 B2 | 10/2013 | Toge et al. |
| 9,188,754 B1 | 11/2015 | Risch et al. |
| 9,201,204 B2 | 12/2015 | Risch et al. |
| 9,223,102 B1 | 12/2015 | Parris et al. |
| 2013/0156390 A1 | 6/2013 | Matsuzawa et al. |
| 2014/0086543 A1 | 3/2014 | Blazer et al. |
| 2015/0234139 A1 | 8/2015 | Cignarale et al. |
| 2016/0011365 A1 | 1/2016 | Berkey et al. |
| 2017/0031121 A1 | 2/2017 | Blazer et al. |
| 2017/0075061 A1 | 3/2017 | Bookbinder et al. |
| 2017/0219792 A1* | 8/2017 | Debban .............. G02B 6/448 |
| 2017/0343751 A1 | 11/2017 | Bookbinder et al. |

OTHER PUBLICATIONS

Single Mode FiberOptics, Jeunhomme, pp. 39-44, Marcel Dekker, New York, 1990.

European Patent Application No. 18843851.9, Extended European Search Report dated Apr. 12, 2021; 7 pages; European Patent Office.

European Patent Application No. 18843851.9, Communication pursuant to Article 94(3) EPC, dated Mar. 28, 2022 11 pages; European Patent Office.

\* cited by examiner

ROLLABLE OPTICAL FIBER RIBBON WITH LOW ATTENUATION, LARGE MODE FIELD DIAMETER OPTICAL FIBER AND CABLE

PRIORITY APPLICATION

This application is a continuation of U.S. patent application Ser. No. 16/853,892, filed Apr. 21, 2020, which is a continuation of U.S. patent application Ser. No. 16/055,773, filed Aug. 6, 2018, now U.S. Pat. No. 10,649,163, which claims priority to Provisional Application No. 62/542,480, filed on Aug. 8, 2017, the content of each of which is relied upon and incorporated herein by reference in its entirety.

BACKGROUND

The disclosure relates generally to rollable optical fiber ribbons and more particularly to rollable optical fiber ribbons that utilize low attenuation, highly bend insensitive fibers with a large mode field diameter. The disclosure also relates to densely packed cables utilizing the low attenuation, rollable fiber optic ribbons discussed herein. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to rollable optical fiber ribbon. The ribbon includes a plurality of optical fibers. Each optical fiber includes a mode field diameter of ≥9 microns at 1310 nm and a macrobend loss of ≤0.5 dB/turn at 1550 nm for a mandrel diameter of 15 mm. The ribbon includes a ribbon body coupled to and supporting the plurality of optical fibers in an array. The ribbon body is formed from a flexible material such that the plurality of optical fibers are reversibly movable from an unrolled position in which the plurality of optical fibers are substantially aligned with each other to a rolled position.

An additional embodiment of the disclosure relates to an optical cable. The optical cable includes a polymeric outer cable jacket defining an exterior surface of the cable. The optical cable includes a plurality of optical fiber ribbons surrounded by the polymeric outer cable jacket. Each of the optical fiber ribbons comprising a plurality of optical fibers coupled together via a ribbon body, and the ribbon body is formed from a flexible material such that the plurality of optical fibers are reversibly movable from an unrolled position to a rolled position. Each optical fiber includes a mode field diameter of ≥9 microns at 1310 nm and a macrobend loss of ≤0.5 dB/turn at 1550 nm for a mandrel diameter of 15 mm.

An additional embodiment of the disclosure relates to cable including a cable jacket. The cable includes a plurality of buffer tubes surrounded by the cable jacket. The cable includes an optical fiber ribbon located within each buffer tube. Each optical fiber ribbon includes a plurality of optical fibers coupled together via a ribbon body. The ribbon body is formed from a flexible material such that the plurality of optical fibers are reversibly movable from an unrolled position to a rolled position. The cable includes active particles located within each buffer tube, and an average maximum outer dimension of the active particles within the buffer tube is ≤50 microns. Each optical fiber includes a mode field diameter of ≥9 microns at 1310 nm and a macrobend loss of ≤0.5 dB/turn at 1550 nm for a mandrel diameter of 15 mm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
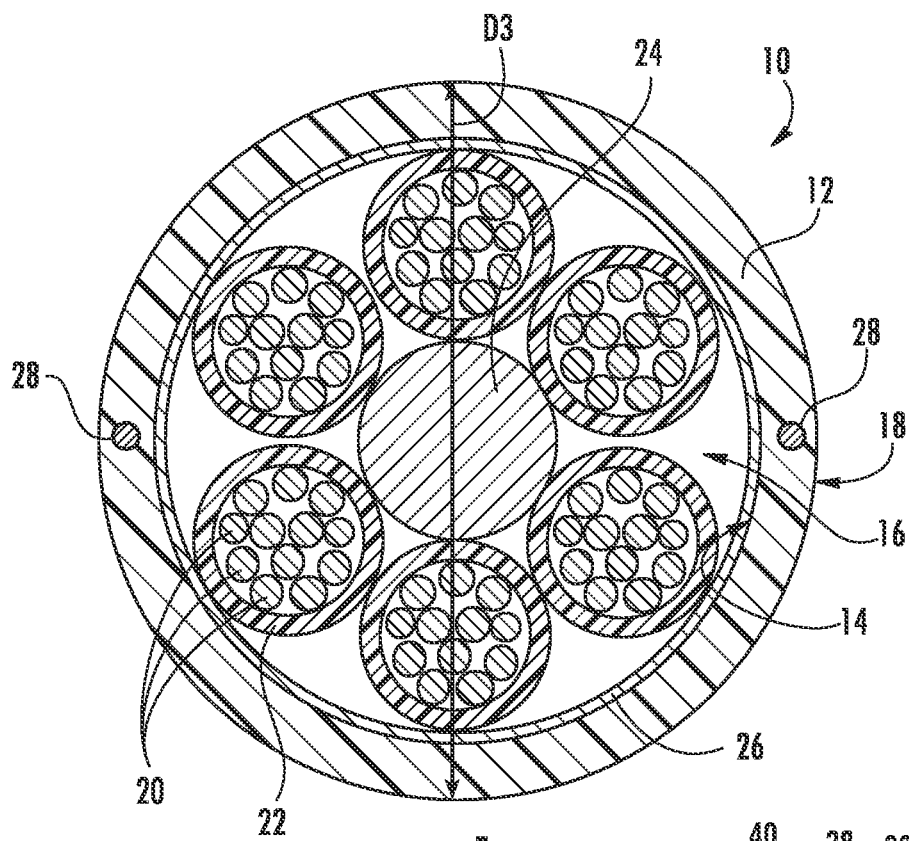
FIG. 1 is a cross-sectional view of an optical fiber cable according to an exemplary embodiment.

Referring generally to the figures, various embodiments of a rollable optical fiber ribbon utilizing low attenuation, bend insensitive fibers and of cables incorporating such rollable ribbons are shown. As background, some optical fiber cables are deployed or used in ways that may induce bend losses in optical signals transmitted through the optical fibers of the cable. Such bend losses can be caused by cable deployments that include tight bend radii, compression of optical fiber, etc., that induce bend losses. Further, such bend losses can be experienced in a wide variety of cables, such optical drop cable assemblies, distribution cables with Factory Installed Termination Systems (FITS) and slack loops.

In addition, bend losses may be greater in cables in which optical fibers are densely packed in relatively rigid buffer tubes, are densely packed within a cable jacket and/or are densely packed in an optical fiber ribbon arrangement. Bend losses in such cables are caused, at least in part, by positional constraint resulting from the dense packing which limits the ability of optical fibers to shift to assume low strain positions during bending, compression, etc. Such bend losses in conventional cables may be further increased when optical fibers are supported by a flexible ribbon matrix and then rolled, for example into a curved cross-sectional shape. Thus, typical optical fiber cable and/or buffer tube configurations include a significant amount of free-space between the outer surfaces of the optical fibers and the inner surface of the buffer tube or jacket, and this free-space allows the optical fibers to move or shift to assume low stress positions during bending. By reducing stress that the optical fibers experience during bending, such low density cables provide a satisfactory level of signal attenuation, but do so with a relatively large diameter buffer tube and/or relatively large cable jacket.

In particular embodiments discussed herein, Applicant has developed new rollable fiber optic ribbons that utilize low attenuation, highly bend insensitive optical fibers. As discussed in detail herein, these highly bend insensitive optical fibers allow for a variety of unique and highly desirable optical cable designs utilizing a rollable fiber optic ribbon. Providing a rollable optical fiber ribbon as discussed herein may provide a number of benefits as compared to conventional optical fiber ribbons or conventional loose buffered optical fibers including increased fiber count, higher packing density, easier connectorization, higher transmission rates, decreased ribbon size and may eliminate the need for buffer tubes, in at least some applications.

As one example of an advantage of the rollable ribbon designs discussed herein, furcation of standard ribbon cable designs requires stripping/removing/severing of a standard ribbon matrix at the furcation point, allowing the fibers of the ribbon to be routed from the main cable body and through a small cylindrical furcation tube. At the end of the furcation tube, the optical fibers need to be realigned (typically by hand) and held in a linear array via application of a glue-like material to allow for splicing of the optical fibers to an optical connector (e.g., via mass fusion splicing). This labor intensive step can be improved by providing a fiber optic cable with a rollable ribbon supporting the optical fibers. The rollable ribbon can assume a rolled shape that can be passed into the furcation tube without removal of the ribbon matrix, and at the end of the furcation tube, the rollable ribbon is simply unrolled to a linear arrangement suitable for splicing to the connector. Thus, the time consuming steps of stripping the ribbon matrix and the manual realignment of optical fibers for coupling to the optical connector are avoided via the designs discussed herein.

Further, in the past, rollable ribbon designs have encountered difficulties related to high bend loss attenuation and attenuation at the connection to the optical connector. To address these deficiencies, the rollable optical fiber ribbon discussed herein utilizes highly bend insensitive fibers having a significantly improved mode field diameter (MFD) as compared to prior bend insensitive fibers. As such, the rollable ribbons discussed herein provide the handling and organization advantages of the rollable ribbon design while providing an MFD which allows for very low levels of signal loss at the optical connector. Thus, the rollable ribbons discussed herein provide the benefit of easy handling and connectorization without the connector attenuation typically caused by the relatively low MFD of typical bend insensitive fibers that has plagued prior attempts to utilize prior bend insensitive fibers in rollable ribbon designs.

Further, in addition to having much improved MFD, the bend insensitive fibers discussed herein have very low macro and/or micro bend attenuation characteristics that allow for tightly rolled optical fiber ribbons that can be densely packed within a cable while still providing for acceptable bend attenuation, despite the tight roll and/or dense packing of the ribbon. In specific embodiments, the designs discussed herein allow for very high fiber count optical cables (e.g., cables having at least 432 optical fibers, at least 1728 optical fibers, at least 3456 optical fibers, etc.) that also have relatively low outer cable diameters. In such embodiments, these optical cables deliver a high fiber count, small size along with the handling advantages of a rollable ribbon, while maintaining the bend attenuation and large mode field diameter ($\geq 9$ microns at 1310 nm) for low coupling losses and easy alignment when spliced or connected to itself and/or standard SMF fibers. Due to the need to balance a wide variety of design parameters when designing an optical cable (e.g., cable size, fiber count, bend attenuation, connector attenuation, ribbon handling/organization limitations, etc.), Applicant believes a rollable ribbon that includes the highly bend insensitive optical fibers discussed herein achieves a combination of cable performance unachievable in the past.

Overview of Rollable Ribbon with Bend Insensitive Fiber and Related Cables

As will generally be understood, optical cables utilizing a rollable ribbon have design and function at the fiber design level, at the ribbon design level and at the cable design level. For clarity, this application describes each of these design levels and related embodiments in the separate sections outlined below, and this overview section provides a brief introduction to the technology described in detail within this application.

Referring generally to FIGS. 19-35 and to the associated description, various embodiments of rollable optical ribbons and related disclosure are provided. In general, the ribbon embodiments disclosed herein are configured to allow the ribbon to be bent, curved or rolled from an unrolled position to a rolled or curved position. In such embodiments, optical fibers are coupled to and supported by a ribbon body. The ribbon body is formed from a material that is configured to allow the ribbon to be rolled and unrolled as needed.

The ribbon embodiments discussed herein may utilize a ribbon matrix that completely or partially surrounds the optical fibers when viewed in longitudinal cross-section. Generally, the ribbon body is formed from a material, such as a polymer material, that has an elasticity and/or thickness that allows for the rollability of the ribbon. In some embodiments, the ribbon body may be formed from a plurality of discreet sections or bridges spaced along the longitudinal axis of adjacent optical fibers. In other various embodiments, the ribbon body is contiguous, both lengthwise and widthwise, over the optical fibers.

Referring to FIGS. 8-14 and to the associated description, details of bend insensitive fibers, and particularly bend insensitive fibers having a large MFD that facilitates low signal loss connectorization are provided. In specific embodiments, as discussed in more detail below, the rolled ribbon designs discussed herein utilize optical fibers having MFD $\geq 9$ microns at 1310 nm, opticals compatible with ITU G.652 and G.657A standards and/or macrobend loss at 15 mm bend mandrel diameter of $\leq 0.5$ dB/turn. The rollable ribbon designs utilizing the bend insensitive, G.652 and G.657A compatible fibers disclosed herein allows for cables with high fiber density that have low coupling losses when connected to standard SMF fibers and that also have low bend loss attenuation and the organizational/handling advantages of an optical fiber ribbon.

In various embodiments, the optical fibers disclosed herein are compatible with G.652 standards, have macrobend loss at 15 mm mandrel diameter of $\leq 0.5$ dB/turn and a zero dispersion wavelength between 1300 nm and 1324 nm. In various embodiments, these optical fibers include a lower index trench region in the cladding layer, that helps to reduce bend loss. In various embodiments, the volume of the trench region is larger than 30% $\Delta$ micron$^2$. In some embodiments, the volume of the trench region is larger than 50% $\Delta$ micron$^2$. In other embodiments, the volume of the trench region is larger than 70% $\Delta$ micron$^2$. In still other embodiments, the volume of the trench region is larger than 90% $\Delta$ micron$^2$. Some of the optical fiber designs have a core alpha $\leq 5$, and in such designs, the lower index trench region in the cladding is adjacent to the fiber core. Some of the optical fiber designs have core alpha between 10 and 100, and in such embodiments, the lower index trench region in the cladding is offset from the fiber core by an inner cladding layer. In some embodiments the coating diameter of the fiber is $\leq 250$ microns, in other embodiments the coating diameter of the fiber is $\leq 210$ microns, and in still other embodiments the coating diameter of the fiber is $\leq 190$ microns.

In various embodiments, the combination of the highly bend insensitive optical fibers and the rollable ribbon designs discussed herein allow for densely packed and/or high fiber count optical fiber cables that also allow for easy handling, connectorization, furcation and organization provided by the use rollable ribbon designs. Referring to FIGS. 1-7 and to the associated description, details of various densely packed optical cable designs are provided. In various embodiments, the cables discussed herein include at least 432 optical fibers. In various embodiments, the cables discussed herein include at least 864 optical fibers. In various embodiments, the cables discussed herein include at least 1728 optical fibers. In yet other embodiments, the cables discussed herein include at least 3456 optical fibers.

In addition, referring to FIGS. 15-18B and to the associated description, the rollable optical fiber ribbons discussed herein may be utilized within optical cables utilizing small sized/diameter particulate material (e.g., small diameter water blocking powder). As discussed in detail below, Applicant has found that use of small particles within a fiber optic cable reduces micro-bend attenuation, and thus, utilization of these small particles in combination with the rollable ribbons discussed herein further improves overall cable attenuation performance.

High Density Cable Designs

Referring to FIG. 1, an optical cable, shown as cable 10, is illustrated according to an exemplary embodiment. Cable 10 includes an outer cable jacket, shown as outer jacket 12, having an inner surface 14 that defines an inner passage or cavity, shown as central bore 16, and an outer surface 18 that generally defines the outermost surface of cable 10. As will be generally understood, inner surface 14 of jacket 12 defines an internal area or region within which the various cable components discussed herein are located.

In various embodiments, cable jacket 12 is formed from an extruded thermoplastic material. In various embodiments, cable jacket 12 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Cable 10 includes one or more optical transmission elements or optical waveguides, shown as optical fibers 20. In the embodiment shown, groups of optical fibers 20 are located in separate buffer tubes 22, and buffer tubes 22 are wrapped (e.g., in an SZ stranding pattern) around a central strength member 24. In various embodiments, optical fibers 20 are supported by a rollable ribbon body or ribbon matrix as discussed herein. In various embodiments, cable 10 includes at least four buffer tubes 22. Central strength member 24 may be any suitable axial strength member, such as a glass-reinforced plastic rod, steel rod/wire, etc. Generally, cable 10 provides structure and protection to optical fibers 20 during and after installation (e.g., protection during handling, protection from elements, protection from the environment, protection from vermin, etc.).

In various embodiments, cable 10 also includes an armor layer, shown as armor 26. In general, armor 26 is formed from a strip of metal material (e.g., a metal tape, a flat elongate continuous piece of material, etc.) that is wrapped around and circumferentially surrounds buffer tubes 22. As shown in FIG. 1, armor 26 is located adjacent to the inner surface of outer jacket 12 such that these two layers are in contact with each other. In specific embodiments, armor 26 is corrugated steel tape material that is wrapped around the interior portions of cable 10, and in some such embodiments, armor 26 is longitudinally folded forming a longitudinal overlapped section where opposing edges of the tape overlap to completely surround inner buffer tubes 22 (and any other interior component of cable 10). In other embodiments, armor 26 may be a strip of metal tape material, helically wrapped around buffer tubes 22 such that armor 26 forms a layer circumferentially surrounding buffer tubes 22. In general, armor layer 26 provides an additional layer of protection to fibers 20 within cable 10, and may provide resistance against damage (e.g., damage caused by contact or compression during installation, damage from the elements, damage from rodents, etc.). Cable 10 may include a variety of other components or layers, such as helically wrapped binders, circumferential constrictive thin-film binders, water blocking tape materials, water-blocking fiber materials, etc. As defined herein the minimum cable core diameter is the minimum diameter without stranding of the buffer tube bundle surrounding and the central member. In some embodiments, stranding the buffer tubes will increase the diameter of the cable core by 1 to 15 percent. In some embodiments, stranding the buffer tubes will increase the diameter of the cable core by 1 to 5 percent.

In the embodiment shown, cable 10 includes one or more preferential tear feature and/or ripcord 28 embedded in or underneath jacket 12. In this embodiment, preferential tear feature and/or ripcord 28 is located with jacket 12 such that ripcord 28 facilitates opening of outer jacket 12. In some embodiments, ripcord 28 may be located within armor layer 26 such that ripcord 28 facilitates opening of both armor 26 and jacket 12.

In various embodiments cable 10, optical fibers 20 and buffer tube 22 are configured in various ways to provide a high fiber density, high fiber count cable while at the same time reducing or minimizing buffer tube size and/or cable jacket size. As discussed herein, low diameter optical fibers allows higher density and smaller cable, and the low bend loss design of these optical fibers allows such high density and small cable to have acceptable signal loss properties. In embodiments where optical fibers 20 are supported by a rollable ribbon body, cable 10 is provided with the organizational and handling advantages of a ribbon while still allowing for dense packing.

Figure 2A:
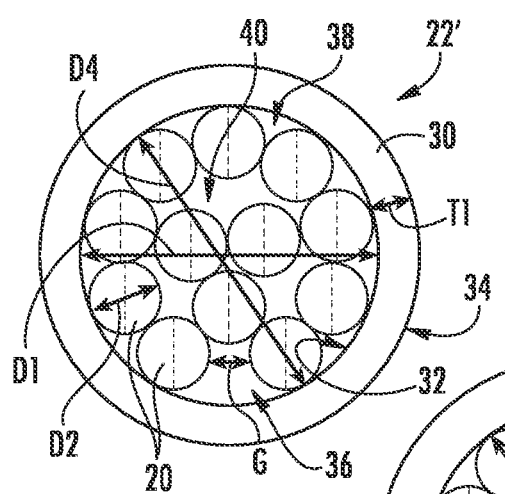
FIGS. 2A-2C are cross-sectional views of optical fiber buffer tubes according to exemplary embodiments.
Figure 2B:
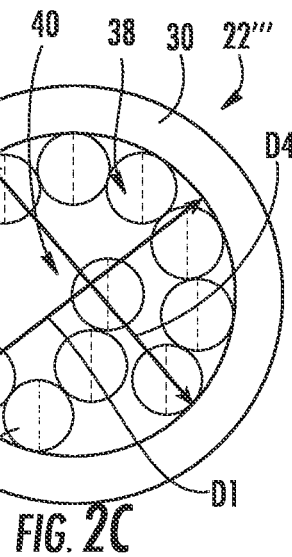
Figure 2C:
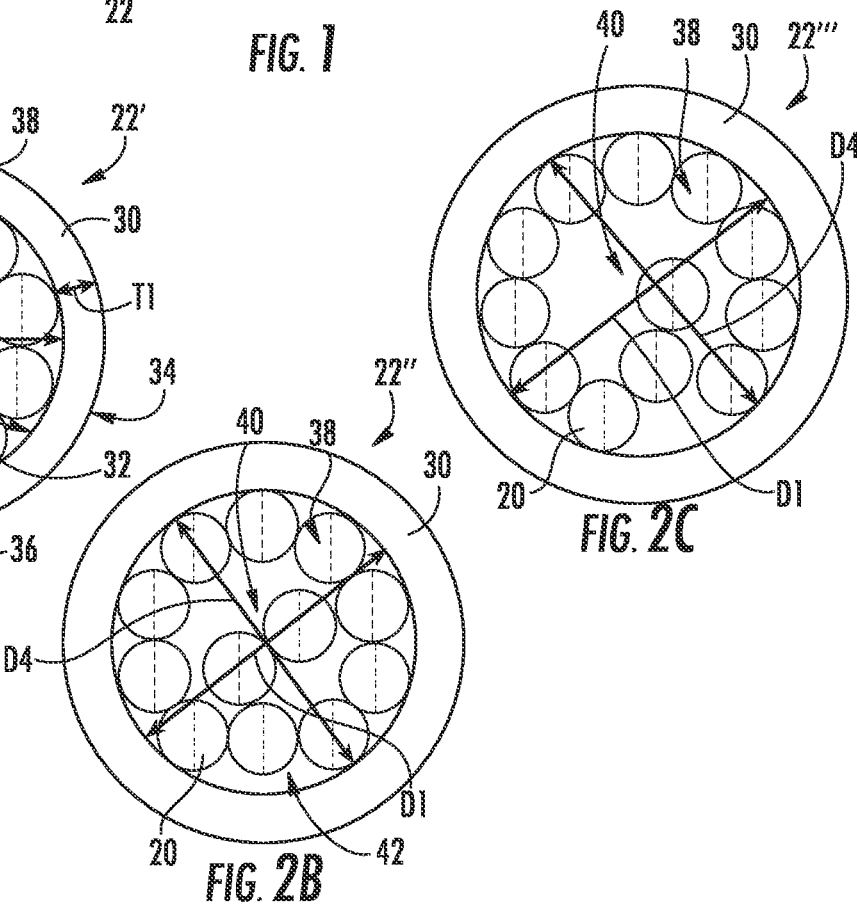

Referring to FIGS. 2A-2C, various buffer tube designs having different levels of fiber packing density are shown. FIGS. 2A-2C show three different buffer tube designs, shown as buffer tubes 22', 22" and 22'''. In general, buffer tubes 22', 22" and 22''' are polymeric tubes that surround, protect and organize optical fibers 20, and further buffer tubes 22', 22" and 22''' are generally the same as each other except for the buffer tube's inner diameter and the resulting optical fiber packing arrangement within each buffer tube discussed in more detail below. Further, it should be understood that cable 10 may include buffer tubes 22', 22" and/or 22''' in any combination. In various embodiments, cable 10 includes only one of buffer tubes types 22', 22" or 22''', and in other embodiments, cable 10 includes a mixture of buffer tubes 22', 22" and/or 22'''.

Referring to FIG. 2A, buffer tube 22' includes a buffer tube wall 30 having an inner surface 32 and an outer surface 34. Inner surface 32 defines a buffer tube channel 36 within which optical fibers 20 are located. As shown in FIG. 2A, optical fibers 20 are arranged into an outer group 38 and an inner group 40 within channel 36. Generally, the optical fibers 20 of outer group 38 are located in the outer portion of channel 36 adjacent to (e.g., ≤5 microns from) or in contact with inner surface 32 such that outer group 38 surrounds inner group 40. Inner group 40 is generally located in a central region of channel 36.

Inner surface 32 defines a buffer tube inner diameter D1, and in the specific embodiment shown in FIG. 2A, D1 is sized such that optical fibers 20 have full positional constraint. In the specific embodiment shown in FIG. 2A, the inner diameter of buffer tube 22' is small relative to the outer fiber diameter, D2, and the number of fibers, N, which results in the full positional constraint shown in FIG. 2A. In particular, buffer tube 22' is sized such that a maximum gap length, shown as G, measured between any pair of adjacent optical fibers 20 of outer group 38 is less than an outer diameter, D2, of one or more optical fiber 20 of inner group 40 such that optical fibers 20 of the inner group 40 are blocked from moving from the inner group 40 to the outer group 38. Thus, in this manner buffer tube 22' results in a fully positionally constrained fiber arrangement, and in this arrangement, buffer tube 22' provides a densely packed unit of optical fibers. Specifically, the portion of the area of channel 36 occupied by optical fibers 20 is high, and the overall inner diameter D1 is low resulting in buffer tube with a large fiber count in a relatively small area.

In particular embodiments, Applicant has determined a relationship between D1 and D2 that defines dense packing of optical fibers 20 within buffer tube 22' as provided by the present disclosure. As a specific example, in various embodiments discussed herein, optical fibers 20 are densely packed within buffer tube 22' such that a diameter ratio parameter, $\Omega$ (Omega), which is defined as the ratio, D1/D2, is less than $2.66+0.134(N)$, where N is the number of optical fibers 20 within buffer tube 22', and in addition, in a specific embodiment, $\Omega$ is also greater than $2.25+0.143(N)$, where N is the number of optical fibers 20 within buffer tube 22'. In various embodiments, N is at least 4, specifically N is greater than 6, and more specifically N is 8 to 24, inclusive of 8 and 24. In another embodiment, N is 12 to 24, inclusive of 12 and 24. In another embodiment, N is greater than 24, and in one such embodiment, 8≤N≤48. In the specific embodiment shown in FIG. 2A, N is 12, D1 is greater than or equal to 4.030 times the fiber OD and less than or equal to 4.273 times the fiber OD. In addition, in this 12 fiber embodiment, outer group 38 has 9 optical fibers 20 and inner group 40 has 3 optical fibers 20.

In various embodiments, the degree of packing of optical fibers 20 within tube 22' can be understood as the ratio of the minimum diameter, D4, of a circle circumscribing all fibers 20 of outer group 38, to buffer tube inner diameter D1. In the embodiments shown in FIGS. 2A-2C, D4 is relatively large such that more than half, and specifically all fibers 20 of outer group 38 are in contact with inner surface 32. In various embodiments, fibers 20 are packed such that the ratio D4/D1 is greater than 0.95, specifically is greater than 0.97, more specifically greater than 0.99 and even more specifically greater than 0.995. In various cable embodiments utilizing these densely packed buffer tubes, Applicant believes that the interaction between the outer surfaces of fibers 20 and the inner surface 32 of tube wall 30 may increase tensile strength of the cable constructed from such tubes, and in such embodiments, the utilization of the various bend insensitive fibers discussed herein provides for satisfactory optical attenuation despite the high level of fiber/tube interaction.

Referring to FIGS. 2B and 2C, different levels of fiber packing density and positional constraint are shown. FIG. 2B shows a buffer tube 22" sized to provide partial positional constraint to optical fiber 20 movement within buffer tube 22", according to an exemplary embodiment. As shown in FIG. 2B, inner diameter D1 of buffer tube 22" is sized such that one of the optical fibers 20 of inner group 40 just fits in the gap 42 between a pair of adjacent optical fibers 20 of outer group 38 and can move back into the inner group 40. As a comparison, FIG. 2C shows buffer tube 22''' sized to provide no positional constraint on optical fibers 20 within buffer tube 22'''.

In various embodiments, buffer tubes 22 of cable 10 as discussed herein have at least some positional constraint. As a specific example, in various embodiments discussed herein, optical fibers 20 are densely packed within a buffer tube, such as buffer tube 22' of 22", such that a diameter ratio parameter, Ω, which is defined as the ratio, D1/D2, is less than 1.14+0.313(N), where N is the number of optical fibers 20 within buffer tube 22' or 22", and in addition, in a specific embodiment, Ω is also greater than 2.25+0.143(N), where N is the number of optical fibers 20 within buffer tube 22' and 22". In various embodiments, N is at least 4, specifically N is greater than 6, and more specifically N is 8 to 24, inclusive of 8 and 24. In another embodiment, N is 12 to 24, inclusive of 12 and 24. In another embodiment, N is greater than 24, and in one such embodiment, 8≤N≤48. In the specific embodiment shown in FIG. 2B, N is 12, D1 of buffer tube 22" is greater than or equal to 4.273 times the fiber OD and less than or equal to 4.87 times the fiber OD and specifically less than 4.864 times the fiber OD. In addition, in this 12 fiber embodiment of buffer tube 22", outer group 38 has 9 optical fibers 20, and inner group 40 has 3 optical fibers 20, and one optical fiber 20 of inner group 40 is permitted to move partially into gap 42 as shown in FIG. 2B.

As a comparison, FIG. 2C, shows buffer tube 22''' sized to have no positional constraint such that one or more optical fibers 20 are permitted to move freely between inner group 40 and outer group 38, which allows optical fibers 20 to assume low strain positions during bending, but requires a larger inner diameter D1 and less dense packing as compared to buffer tubes 22' and 22". Specifically, as shown in FIG. 2C, optical fibers 20 are not densely packed within buffer tube 22''' such that a diameter ratio parameter, Ω, of buffer tube 22''' which is defined as the ratio, D1/D2, is greater than 1.14+0.313(N), where N is the number of optical fibers 20 within buffer tube 22''', for, N greater 6, N greater than 24, and N 8 to 24, inclusive of 8 and 24. In the specific embodiment shown in FIG. 2C, N is 12, D1 of buffer tube 22''' is greater than or equal to 4.864 times the fiber OD.

In specific embodiments, the dense fiber packing and high fiber count within buffer tube 22' is facilitated by an optical fiber having a low outer diameter, and various optical fiber properties that allows for low signal loss despite the dense packing and high fiber count. In various embodiments, such fibers may have a variety of properties in various combinations, such as an outer diameter D2≤210 microns, a mode field diameter of ≥9 microns at 1310 nm, a cable cutoff of ≤1260 nm, a macrobend loss of ≤0.5 dB/turn at 1550 nm for a mandrel diameter of 15 mm, and/or a wire-mesh covered drum microbending loss at 1550 nm of ≤0.03 dB/km. In some such embodiments, D2 is ≤190 microns. In other embodiments, such fibers may have a variety of properties in various combinations, such as an outer diameter D2≤210 microns, a mode field diameter of ≥9 microns at 1310 nm, a cable cutoff of ≤1260 nm, a macrobend loss of ≤0.5 dB/turn at 1550 nm for a mandrel diameter of 20 mm, and/or a wire-mesh covered drum microbending loss at 1550 nm of ≤0.03 dB/km. In some such embodiments, D2 is ≤190 microns. In specific embodiments, optical fibers 20 may be any of the optical fibers or include any of the optical fiber features or characteristics discussed herein. It should be understood that the outer fiber diameters discussed herein, such as D2, are the outer diameter measured at the outer surface of the outermost polymer fiber coating layer, typically a secondary polymer coating as discussed herein.

In various embodiments, tube walls 30 of buffer tubes 22', 22" and 22''' are relatively rigid, relatively thick polymer structures such that during bending, tube walls 30 do not deform to a sufficient degree to allow for optical fibers 20 to assume a low strain position through deformation of the buffer tube wall itself. This is in contrast to some optical fiber bundles or micromodules that are densely packed by utilizing flexible, thin bundle jackets. In such optical fiber bundles dense packing and acceptable bend loss characteristics are achieved through the flexible nature of the bundle jacket which allows for fiber movement during bending. In contrast to such optical fiber bundles, in various embodiments, buffer tubes 22' and 22" do not allow for substantial movement and achieves acceptable bend loss characteristics via use of low diameter, bend insensitive optical fibers, such as those discussed herein.

In various embodiments, tube walls 30 have a thickness T1 that is between 50 microns and 250 microns. In particular embodiments, tube walls 30 are formed from a material having a having a modulus of elasticity at 25° C. between 0.8 GPa and 3 GPa. In various embodiments discussed herein, tube walls 30 having these thicknesses and/or moduli form relatively rigid tubular structures that do not bend, stretch, deform, etc. to a significant amount within the cable, and thus, in such embodiments, optical fibers 20 are bend insensitive fibers as discussed herein. Such bend insensitive fibers allow for low optical attenuation despite residing in highly packed, thick and/or high modulus tubes 22.

Buffer tube walls 30 may be made from a variety of suitable polymer materials. In one embodiment, buffer tube walls 30 are formed from a polypropylene material. In another embodiment, buffer tube walls 30 are formed from a polycarbonate material. In various embodiments, buffer tube walls 30 are formed from one or more polymer material including polybutylene terephthalate (PBT), polyamide (PA), polyoxymethylene (POM), polyvinylchloride (PVC), flame retardant PCV, poly (ethylene-co-tetrafluoroethene) (ETFE), or various combinations of the polymer materials discussed herein, etc. In various embodiments, the material of buffer tube walls 30 may include various fillers or additives including UV blocking materials and burn resistant materials.

Figure 3:
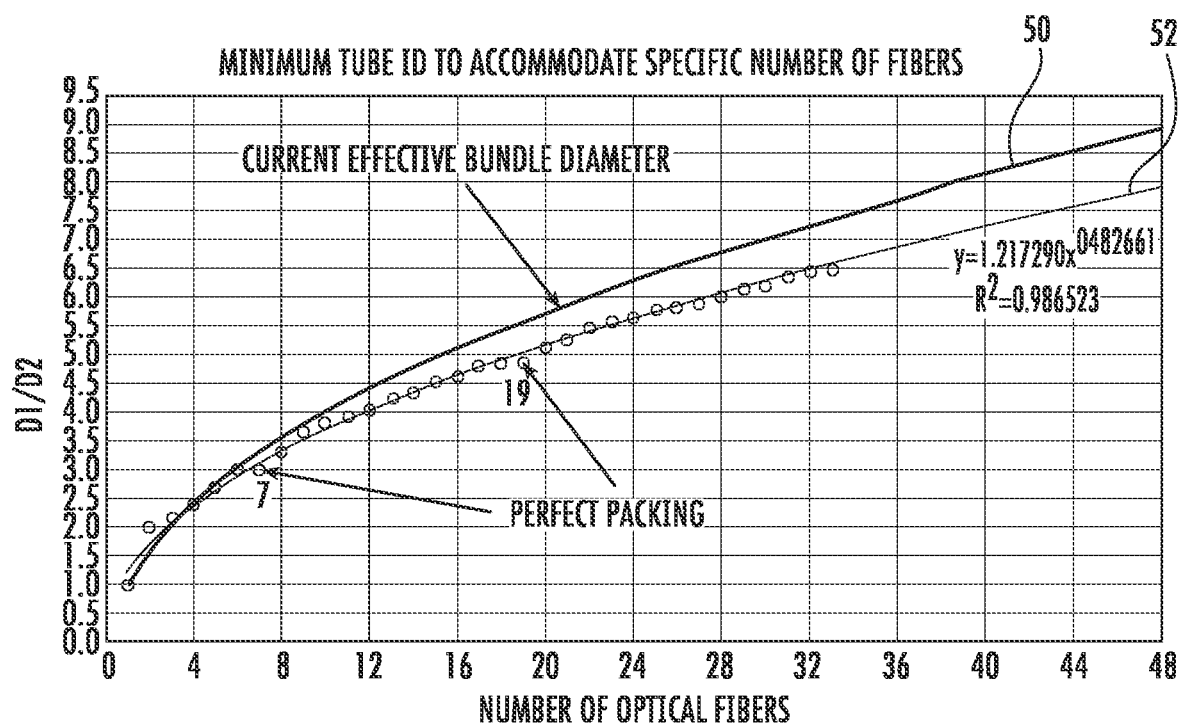
FIG. 3 is a graph showing the minimum ratio of buffer tube inner diameter to optical fiber outer diameter as a function of number of optical fibers in the buffer tube.

As a specific example of the various buffer tube sizing and fiber packing of the present disclosure, FIG. 3 shows a plot of the minimum ratio of buffer tube inner diameter to fiber outer diameter as a function of the number of fibers in the buffer tube. Plot 50 shows the normalized effective bundle diameter assumed for a defined number of fibers in a bundle and plot 52 shows the minimum normalized tube ID to just accommodate a defined number of fibers. This is a fit to the modeled data defining the minimum normalized diameter of circumscribing circle to just fit around each bundle of fibers from 1 to 48 fibers.

Referring back to FIG. 1, in particular embodiments, one or more buffer tubes 22 of cable 10 is one or more of densely packed buffer tube, such as buffer tubes 22' and 22" discussed above. In such embodiments, the dense packing and small diameter of buffer tubes 22' or 22" allow for cable 10 to also be densely packed and have a small diameter despite having a large number of optical fibers 20. As shown in FIG. 1, cable 10 has an outer diameter, D3, that is less than 15 mm, and in the particular embodiment shown, cable 10 has this low outer diameter while including at least 72 optical fibers located in 6 buffer tubes.

Figure 4:
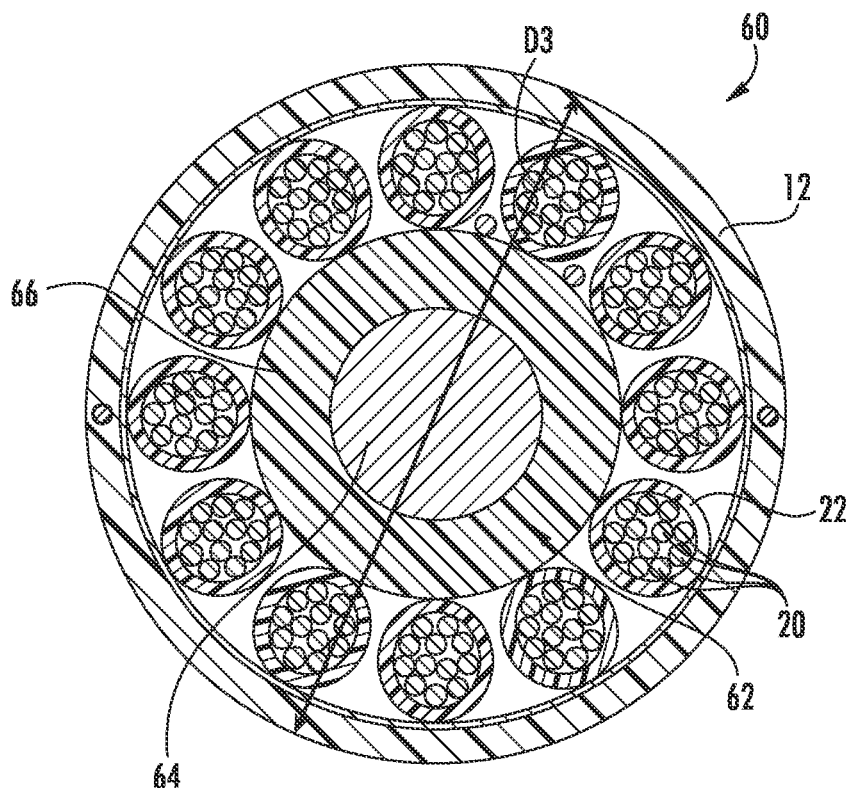
FIG. 4 is a cross-sectional view of an optical fiber cable according to another exemplary embodiment.

Referring to FIG. 4, an optical fiber cable 60 is shown according to an exemplary embodiment. Cable 60 is substantially the same as cable 10 except as discussed herein. As shown, cable 60 includes at least 144 optical fibers, and includes at least 12 buffer tubes 22 each including 12 optical fibers 20. Like cable 10, cable 60 includes an outer diameter D3 that is less than 15 mm, and buffer tubes 22 are fully constrained buffer tubes 22'. In other embodiments, buffer tubes 22 of cable 60 may be buffer tubes 22" and/or buffer tubes 22'". In addition, cable 10 includes a jacketed central strength member 62 including central portion 64 and an outer jacket 66. In particular embodiments, central portion 64 may be relatively rigid, such as a metal material or glass reinforced plastic, and outer jacket 66 is a polymer coating.

Figure 5:
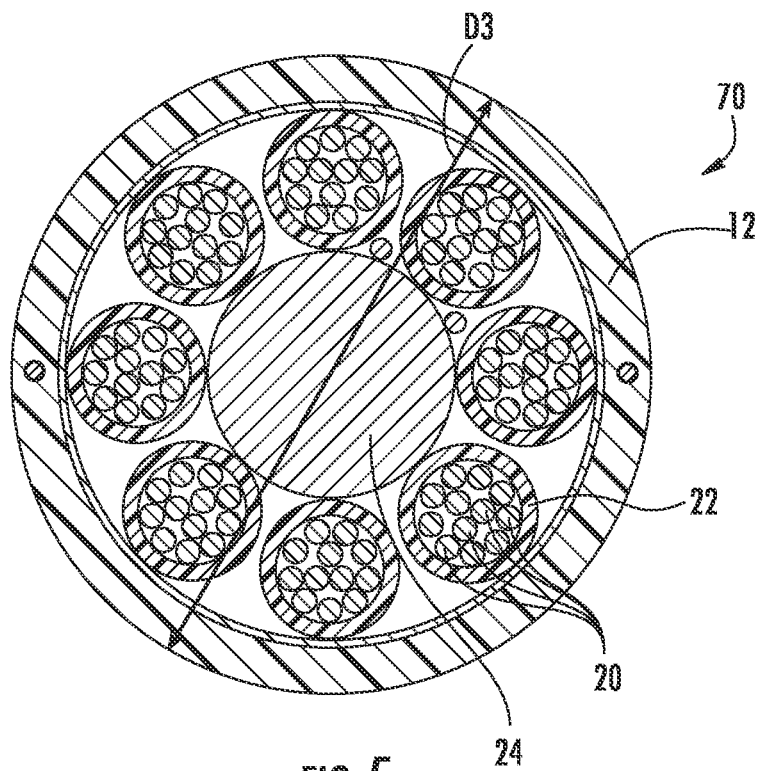
FIG. 5 is a cross-sectional view of an optical fiber cable according to another exemplary embodiment.

Referring to FIG. 5, an optical fiber cable 70 is shown according to an exemplary embodiment. Cable 70 is substantially the same as cable 10 except as discussed herein. As shown, cable 70 includes at least 96 optical fibers, and includes at least 8 buffer tubes 22 each including 12 optical fibers 20. Like cable 10, cable 70 includes an outer diameter D3 that is less than 15 mm, and buffer tubes 22 are fully constrained buffer tubes 22'. In other embodiments, buffer tubes 22 of cable 70 may be buffer tubes 22" and/or buffer tubes 22'".

Figure 6:
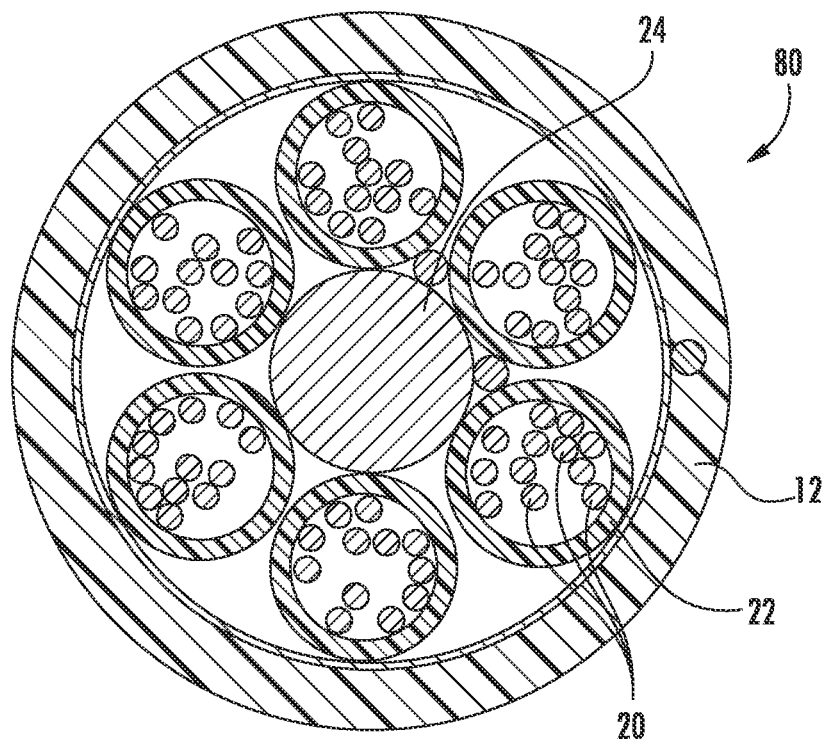
FIG. 6 is a cross-sectional view of an optical fiber cable according to another exemplary embodiment.

Referring to FIG. 6, an optical fiber cable 80 is shown according to an exemplary embodiment. Cable 80 is substantially the same as cable 10 except as discussed herein. As shown cable 80 includes at least 72 optical fibers, and includes at least 6 buffer tubes 22 each including 12 optical fibers 20. In the specific embodiment shown, buffer tubes 22 are unconstrained buffer tubes 22'. Thus, cable 80 achieves very low bend loss through use of both unconstrained buffer tubes 22' which allows for fibers 20 to move during bending to achieve low strain positions in combination with the low diameter, low bend loss optical fibers discussed herein.

Figure 7:
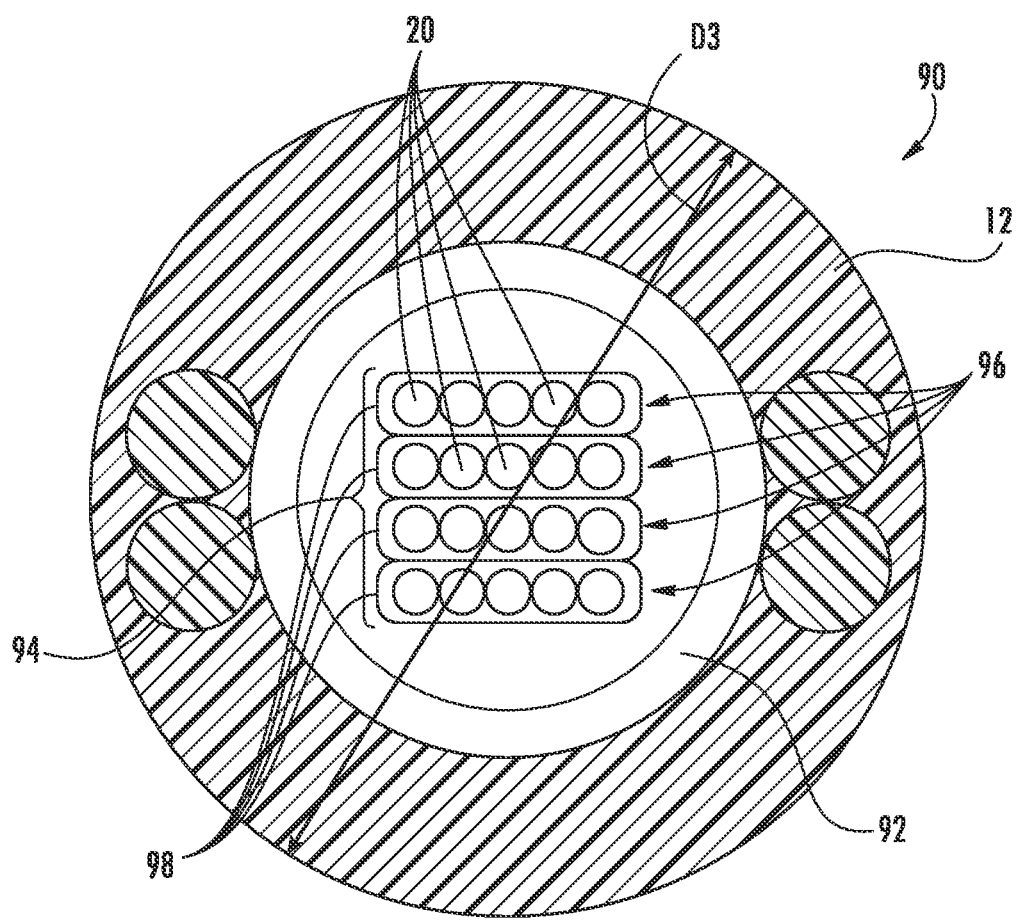
FIG. 7 is a cross-sectional view of an optical fiber cable according to another exemplary embodiment.
Figure 8:
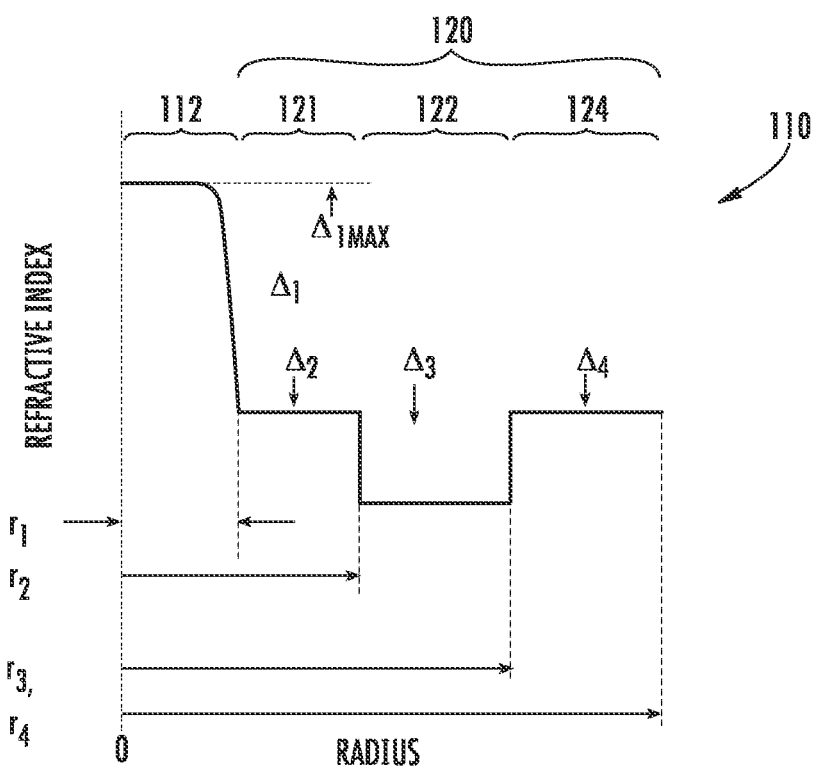
FIG. 8 shows a refractive index profile corresponding to one embodiment of an optical waveguide fiber as disclosed herein.

Referring to FIG. 7, an optical fiber cable 90 is shown according to an exemplary embodiment. Cable 90 is substantially the same as cable 10 except as discussed herein. As shown cable 90 includes a single buffer tube 92, and a stack 94 of a plurality of optical fiber ribbons 96. Each optical fiber ribbon 96 includes a plurality of optical fibers 20 surrounded by and supported by a polymeric matrix 98. In various embodiments, cable 90 includes at least four ribbons within stack 94 and each ribbon 96 supports four optical fibers 20. In some embodiments, like cable 10, cable 90 includes an outer diameter D3 that is less than 15 mm. In such embodiments cable 90 provides a low bend loss, low diameter ribbon cable utilizing the low diameter, low bend loss optical fibers discussed herein. In various embodiments, ribbons 96 are rollable ribbons and matrix 98 is formed from a flexible material that permits rolling of ribbons 96 as discussed herein.

Low Bend Loss, Large Mode Field Diameter Optical Fibers

Optical fibers 20 discussed herein are configured to experience low signal loss during bending. In various embodiments, optical fibers 20 discussed herein may be any of the optical fibers discussed herein and specifically may be configured as the various embodiments of optical fiber 110, discussed herein. In addition, in various embodiments, optical fibers 216 discussed below in relation to specific rollable ribbon designs may be any of the optical fibers discussed herein and specifically may be configured as the various embodiments of optical fiber 110, discussed herein.

According to at least some embodiments the optical fibers have low bend-induced losses especially for tight bends, such as 15 mm diameter bends, for applications in data centers and fiber to the home installations. According to at least some embodiments the optical fibers disclosed herein are backward compatible with existing installed fiber network systems. According to at least some embodiments, the optical fibers disclosed herein have a 1310 nm wavelength mode field diameter of ≥8.6 microns in order to have low splice losses with existing installed optical fibers. According to at least some embodiments, the optical fibers disclosed herein have a 1310 nm wavelength mode field diameter of >9 microns in order to have low splice losses with existing installed optical fibers. Optical fibers disclosed herein can be cabled and can be part of a network system having a transmitter and receiver.

The "refractive index profile" is the relationship between refractive index or relative refractive index and the fiber radius. The radius for each segment of the refractive index profile is given by the abbreviations $r_1$, $r_2$, $r_3$, $r_{4a}$, $r_4$, etc. and lower an upper case are used interchangeability herein (e.g., $r_1$ is equivalent to $R_1$).

The "relative refractive index percent" (also referred to herein as "refractive index delta percent", "relative refractive index", "refractive index delta", and "relative refractive index delta") is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. The terms: delta, $\Delta$, $\Delta\%$, % $\Delta$, delta $\Delta$, $\Delta$ delta and percent delta may be used interchangeably herein. For embodiments described herein, an equivalent relative refractive index profile can be obtained by shifting the entire refractive index profile of the optical fiber is either up or down. In cases where the refractive index of a region is less than the average refractive index of undoped silica, the relative refractive index percent is negative and is referred to as having a depressed region or depressed index.

In cases where the refractive index of a region is greater than the average refractive index of the cladding region, the relative refractive index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as in equation 1 as:

$$A_{eff}=2\pi(\int f^2 r dr)^2/(\int f^4 r dr) \quad \text{Eq. 1}$$

where the integration limits are 0 to ∞, r is the radial distance from the center of the core, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a refractive index profile, expressed in terms of Δ(r) which is in units of "%", where r is radius, which follows the equation 2, shown below $$\Delta(r)=\Delta(r_o)(1-[r-r_o|/(r_1-r_o)]^\alpha) \quad \text{Eq. 2}$$

where $r_o$ is the point (radial location) in the core at which Δ(r) is maximum, $r_1$ is the point at which Δ(r) % is zero, and r is in the range $r_i \le r \le r_f$, where Δ is defined above, $r_i$ is the initial point of the α-profile, $r_f$ is the final point of the α-profile, and α is an exponent which is a real number (referred to as "core α", "core alpha", "alpha value" or "α value" herein).

The mode field diameter (MFD) is measured using the Peterman II method wherein, 2w=MFD, and $w^2=(2\int f^2 r dr/\int [df/dr]^2 r dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

Another type of bend test is the basketweave microbend loss test. In the basketweave microbend loss test, the fibers are wound at high tension on a glass spool and exposed to a temperature cycle. The testing apparatus comprises of a fixed diameter silica drum. The drum surface is smooth. In this test, the drum diameter is 110 mm. The fiber is wound onto the glass drum with a winding tension of 70 grams, and a pitch of 2 mm (distance between adjacent wraps of fiber). Multiple layers of fiber are wrapped with this tension and pitch. The pitch angles are reversed with each layer wound. The crossover of the tensioned fibers from the adjacent layers creates the microbend mechanism. A fiber length of 2.5 km is used. The initial fiber attenuation measurement is performed at about 23°, at about 45% RH (relative humidity) with the fiber deployed in the basketweave configuration with 70 grams of tension. Initial attenuation loss measurements are made at wavelengths of 1310 nm, 1550 nm, and 1625 nm. An OTDR (optical time domain reflectometer) is used to acquire the attenuation loss data.

After the initial attenuation loss measurement at 23° C., the fiber is subjected to thermal cycling. In the thermal cycling, the fiber is first cooled from 23° C. to −60° C. at a rate of 1° C./min. The fiber is maintained at −60° C. for 20 hours and then heated at a rate of 1° C./min back to 23° C. The fiber is maintained at 23° C. for 2 hours, then heated to 70° C. at a rate of 1° C./min and maintained at 70° C. for 20 hours. The fiber is then cooled to 23° C. at a rate of 1° C./min and maintained at 23° C. for two hours. The fiber is then subjected to a second thermal cycle, which was identical to the first thermal cycle—i.e., it is cooled from 23° C. to −60° C., then heated back to 23° C., maintained at that temperature for 2 hours and then heated from 23° C. to 70° C., after which it is cooled back to 23° C. Finally, after maintaining the fiber at a temperature of 23° C. for two hours, after the second cycle, the fiber is once again cooled to −60° C. at a rate of 1° C./min, held at −60° C. for 20 hours, and then further cooled at a rate of 1° C./min to −60° C. The fiber is held at −60° C. for 20 hours, then heated at a rate of 1° C./min back to 23° C. and held at 23° C. for 2 hours. The thermal cycling is concluded at this point.

During the thermal cycling of the fiber, the attenuation loss of the fiber is measured continuously. The maximum attenuation loss over the two thermal cycles down to −60° C. is determined, and the difference between this maximum attenuation loss and the initial attenuation loss at 23° C. is reported herein, as the basketweave microbend loss of the fiber over the temperature range from −60° C. to 70° C. In the thermal cycle down to −60° C., the difference between the attenuation loss measured at −60° C. and the initial attenuation loss at 23° C. is reported herein as the basketweave microbend loss of the fiber over the temperature range from −60° C. to 23° C.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, "cable cutoff", "cable cutoff wavelength", or "cabled cutoff" as used herein, we mean the cable cutoff wavelength determined by the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, Unless otherwise noted herein, optical properties (such as dispersion, dispersion slope, etc.) are reported for the LP01 mode.

Optical fibers disclosed herein are capable of exhibiting an effective area at 1550 nm which is greater than about 70 microns$^2$, in some embodiments between 75 and 95 microns$^2$, for example between about 80 and 90 microns$^2$. In some embodiments, the optical mode effective area at 1550 nm is between about 82 and 88 microns$^2$.

The embodiments of the fiber 110 is (see, for example, FIG. 8) include a core 112 with comprising maximum refractive index delta percent $\Delta_1$, and a cladding 120 that surrounds the core 112. In at least some embodiments disclosed herein the core alpha is larger than 5 (i.e., $\alpha > 5$). According to the exemplary embodiments described herein, fiber 110 is preferably a single mode fiber.

The cladding 120 includes inner cladding region 121 that is in contact with and surrounds the core 112, a depressed index cladding region 122 (also referred to as a trench region herein) that surrounds the inner cladding region 121. The cladding region 122 has a refractive index delta percent 43. The outer cladding region 124 surrounds the trench region 122 and comprises a refractive index delta percent $\Delta_4$. A trench region is a low refractive index region, surrounded by the higher refractive index regions. As shown for example, in FIG. 8, the trench region 122 within the cladding 120 is surrounded by two higher index cladding regions—i.e., cladding regions 121 and 124.

In the embodiments described herein $\Delta_{1max} > \Delta_4$; $\Delta_3 < \Delta_2$; and $\Delta_4 > \Delta_3$. In the embodiments illustrated in FIGS. 8-14, cladding regions 121, 122 and 124 are immediately adjacent one another. However, this is not required, and alternatively, additional cladding regions may be employed.

The core 112 comprises an outer radius $r_1$ (which is defined as where a tangent line drawn through maximum slope of the refractive index delta percent of central core 112 crosses the zero delta line) that is between 2.75 and 6 microns, in some embodiments between about 3 and 5.75 microns, for example between 3.5 and 5.6 microns, and in some embodiments 4-5 microns. Core 112 exhibits a refractive index delta percent $\Delta_1$, (relative to pure silica). For example the maximum refractive index delta of the core, $\Delta_{1max}$, may be 0 percent (if it is made of pure silica) to 0.65 percent, or between 0.15 and 0.5 percent, and in some embodiments between about 0.2 and 0.5 percent. In some embodiments $\Delta_{1max} \geq 0.38$, for example $0.5 \geq \Delta_{1max} \geq 0.38$.

In some embodiments, the core 112 exhibits a core alpha ($\alpha$) wherein, $\alpha$ is greater than 5, for example at least 10. In some embodiments the core alpha is 15 or greater. In some embodiments, the core 112 may comprise an alpha between about 10 and 100, for example in some embodiments the core alpha, $\alpha$, may be between 15 and 100, and in some embodiments between 15 and 40. A refractive index profile of an exemplary fiber embodiment with $\alpha_1$ of about 20 is shown, for example, in FIG. 8.

In the embodiments illustrated in FIG. 10-14, the inner cladding region 121 is adjacent to the core 112 and comprises inner radius $r_1$ and outer radius $r_2$. The inner cladding region 121 preferably exhibits a refractive index delta percent, $\Delta_2 \leq 0.3$ (relative to pure silica). As stated above, $\Delta_1 \geq \Delta_2$. In the exemplary embodiments described herein, $0.15\% \leq \Delta_{1max} - \Delta_2 \leq 0.5\%$, for example $0.2\% < \Delta_{1max} - \Delta_2 < 0.4\%$, or $0.25\% < \Delta_{1max} - \Delta_2 \leq 0.35$. In some embodiments $\Delta_2$ is 0 to 0.3 percent, for example between about 0 and 0.25 percent, or between 0.1 and 0.2 percent. Alternatively, for example, if the core region 112 (also referred to as a core herein) is made of pure silica, the inner cladding region 121 is downdoped relative to pure silica, such that $\Delta_{1max} - \Delta_2 \leq 0.5$ percent. The outer radius $r_2$ of the inner cladding region 121 is between 5 and 17 microns, in some embodiments between about 7 and 15 microns, for example 6 to 12 microns, or 6 to 10 microns. In some embodiments the ratio of $r_2/r_1$ is >1.2. In some embodiments the ratio of $r_2/r_1$ is $\geq 1.25$, for example $1.25 \leq r_2/r_1 \leq 2.5$. In at least some of the exemplary embodiments described herein $1.6 \leq r_2/r_1 \leq 2.4$. In at least some of the exemplary embodiments described herein $1.8 \leq r_2/r_1 \leq 2.35$. The above values of the radius $r_1$, the difference between $\Delta_{1max}$ and $\Delta_2$, and the $r_2/r_1$ ratio help the fibers have 1300 nm $\leq \lambda_0 \leq 1324$ nm and MFD between 8.2 microns and 9.5 microns at the 1310 nm wavelength.

The trench region 122 (also referred to as depressed index cladding region herein) surrounds the inner cladding region 121. The trench region 122 has a refractive index delta percent $\Delta_3$ that is smaller than $\Delta_2$. In some embodiments $\Delta_3$ is $-0.4\% \leq \Delta_3 \leq 0.1\%$. For example, in some embodiments the trench is formed of pure silica, and $\Delta_3$ is 0. In some embodiments the relative refractive index delta percent in the trench region 122 is essentially flat, i.e. the difference between the relative refractive index delta percent at any two radii within the trench region 122 is less than 0.03%, and in some embodiments less than 0.01%. In other embodiments there can be fluctuations as a result of small profile design or process variations. In some embodiments, the trench region 122 comprises silica which is substantially undoped with either fluorine or germania, i.e., such that the region is essentially free of fluorine and germania, i.e., less than 0.1 wt. % F or $GeO_2$. In some embodiments, the trench region is pure silica, in other embodiments it is silica doped with fluorine, in order to make $-0.4\% \leq \Delta_3 \leq 0.1\%$. In some embodiments, $0.35\% \leq \Delta_{1max} - \Delta_3 \leq 0.65\%$.

The trench region 122 preferably exhibits a width $W_t$ (wherein $W_t = r_3 - r_2$) between about 4 microns and 22 microns, in some embodiments, between 8 and 20 microns. In some embodiments, the outer radius $r_3$ of the trench region may be not less than 10 microns, for example greater than 12 microns and less than 27 microns, or about 14.5 microns to about 25.5 microns in order to achieve good bend performance and a cable cutoff of ≤1260 nm.

Outer cladding region 124 surrounds the trench region 122 and comprises refractive index delta percent $\Delta_4$ which is higher than the refractive index delta percent $\Delta_3$ of the trench region 122, thereby forming a region which is an "updoped" outer cladding region 124 with respect to the depressed index cladding region 122, e.g., by adding an amount of dopant (such as germania or chlorine) sufficient to increase the refractive index of the outer cladding region. In some embodiments, there is no fluorine or other down dopants in the trench region 122, and the outer cladding region 124 comprises an updopant, for example chlorine. In some embodiments, the chlorine concentration in the outer cladding region 124 is ≥1 wt. %. In some other embodiments, the chlorine concentration in the outer cladding region 124 is ≥1.2 wt. %. In still other embodiments, the chlorine concentration in the outer cladding region 124 is ≥1.5 wt. %. In yet other embodiments, the chlorine concentration in the outer cladding region 124 is ≥2 wt. %.

Outer cladding region 124 comprises a higher refractive index than that of the trench region 122, and may, for example, have a refractive index delta percent $\Delta_4$ which is between 0.12% and 0.4%. In some embodiments $0.12\% \leq \Delta_4 - \Delta_3 \leq 0.4\%$, for example in some embodiments $0.12\% < \Delta_4 - \Delta_3 < 0.3\%$. In some embodiments, the outer cladding region 124 is comprised of a first outer cladding region 123 (with an outer radius $r_{4a}$) and a second outer cladding region 125 (with an outer radius $r_4$), wherein the first outer cladding region 123 has a chlorine concentration of ≥1.2 wt % from $r_3$ to 40 microns. In some embodiments first outer cladding region 123 has a chlorine concentration of ≥1.5 wt. % from $r_3$ to 40 microns, and in some embodiments, the first outer cladding region 123 has a chlorine concentration of ≥2 wt. % from $r_3$ to 40 microns.

Figure 9:
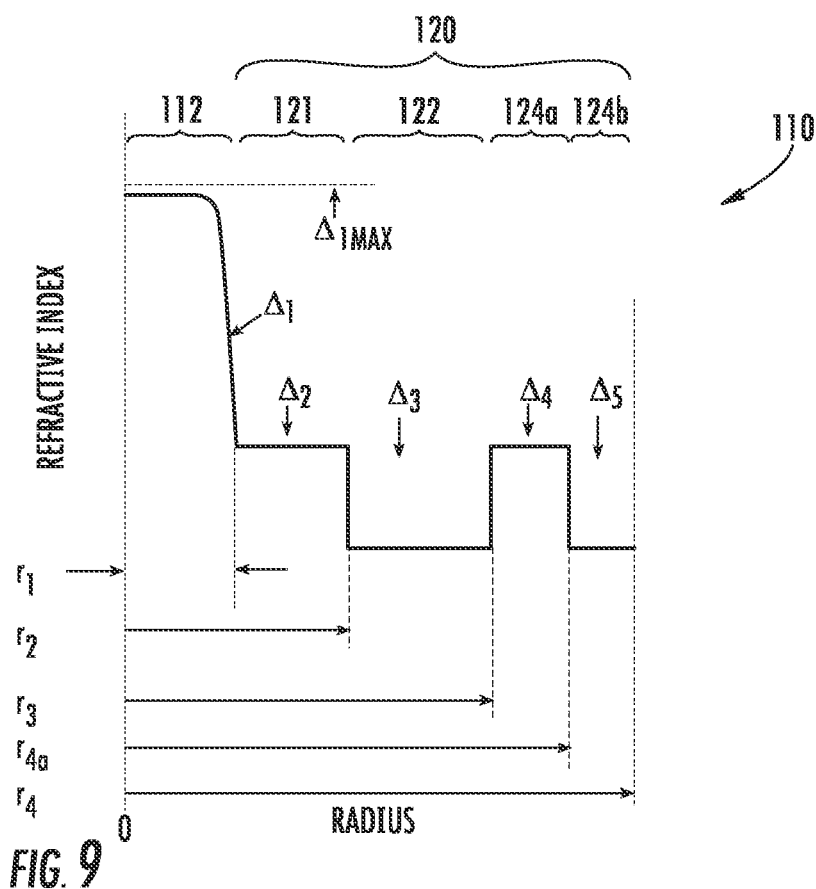
FIG. 9 shows a refractive index profile of an embodiment of an optical fiber as disclosed herein.

In some embodiments, the second outer cladding region 125 has a higher viscosity than the first outer cladding layer. That is, the viscosity of the glass of the second outer cladding region 125 is greater than the viscosity of glass of the first outer cladding region 123. In this embodiment the second outer cladding region 125 is the tension absorbing layer. In some embodiments, the second outer cladding region 125 has a chlorine concentration of ≤0.5 wt. % from $r_{4a}$ to $r_4$ (where $r_{4a}$ is the outer radius of the high (e.g., ≥1.2 wt. % Cl) updoped region, as shown for example in FIG. 9, and $r_4$ is the outer radius of the glass optical fiber, for example, 62.5 microns). In some embodiments the second outer cladding region 125 has a chlorine concentration of ≤0.25 wt. % from its inner radius $r_{4a}$ to the outer radius $r_4$. In some embodiments the second outer cladding region has a chlorine concentration, [Cl], of 0.0 wt. % [Cl]≤0.2 wt. % from $r_{4a}$ to $r_4$. In some embodiments, 40 microns≤$r_{4a}$≤55 microns, for example $r_{4a}$ is at 40 microns, 45 microns, 50 microns, or 55 microns. Preferably, the higher index portion (compared trench region 122) of outer cladding region 124 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted, which is preferred to achieve good bend performance and a cable cutoff of ≤1260 nm. In some embodiments, this is achieved by having the "updoped" third annular region (i.e., the first outer cladding region 123) extend at least to a radial point of about 30 microns. In some embodiments, the "updoped" third annular region 123 extends at least to a radial point of about 40 microns, with a fourth annular region (i.e., the second outer cladding region 125) comprising essentially of silica surrounding the third annular region. In some embodiments, the cladding 120 has an outer diameter of 2 times the maximum radius, $R_{max}$, of about 125 micron. As shown in FIG. 9, the updoped region 123 (i.e., the first outer cladding region) of the outer cladding 124, has a refractive index delta percent of $\Delta_4$ and the cladding region 125 (i.e., the second outer cladding region) has a refractive index delta percent of $\Delta_5$, and $\Delta_4 > \Delta_5$.

The profile volume $V_3$ of the trench region 122, is calculated using $\Delta_{(4-3)}(r)rdr$ between radius $r_2$ and $r_3$, and thus is defined in equation 3 as $$V_3 = 2 \int_{r2}^{r3} \Delta_{(4-3)}(r)rdr \qquad \text{Eq. 3}$$

All volumes are in absolute magnitude (i.e., $V_3 = |V_3|$). In order to achieve good bend performance, the volume $V_3$ of the trench region 122 is preferably greater than 30% $\Delta micron^2$, and may be greater than 45% $\Delta micron^2$, and in some embodiments is greater than 50% $\Delta micron^2$, and in some embodiments may be greater than 55% $\Delta micron^2$. In some embodiments the volume $V_3$ of the trench region 122 is 30% $\Delta micron^2$ to 90% $\Delta micron^2$, for example 40 to 80% $\Delta micron^2$.

In the exemplary embodiments disclosed herein the core 112 has a positive refractive index throughout. The core region 112 comprises a maximum refractive index delta percent $\Delta_{1max}$ occurring between r=0 and r=3 microns. In these embodiments $\Delta_{1max}$ is between about 0.38% and about 0.5%.

The fibers are capable of exhibiting a bend loss of ≤0.5 dB/turn when wound upon on a 15 mm diameter mandrel for fibers with MAC numbers≥7.25. In some embodiments, the optical fibers disclosed herein have a MAC number of ≥7.6 or even ≥7.7 and in some examples, 7.6≤MAC≤8, and a zero dispersion wavelength, $\lambda_0$ of 1324 nm≥$\lambda_0$≥1300 nm. As used herein, MAC number means mode field diameter at 1310 (nm) divided by 22 m cable cutoff wavelength (nm).

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which are hereby incorporated by reference.

Various exemplary embodiments will be further clarified by the following examples. It will be apparent to those skilled in the art that various modifications and variations can be made without departing from the spirit or scope of the claims.

Optical Fiber Examples

Figure 10:
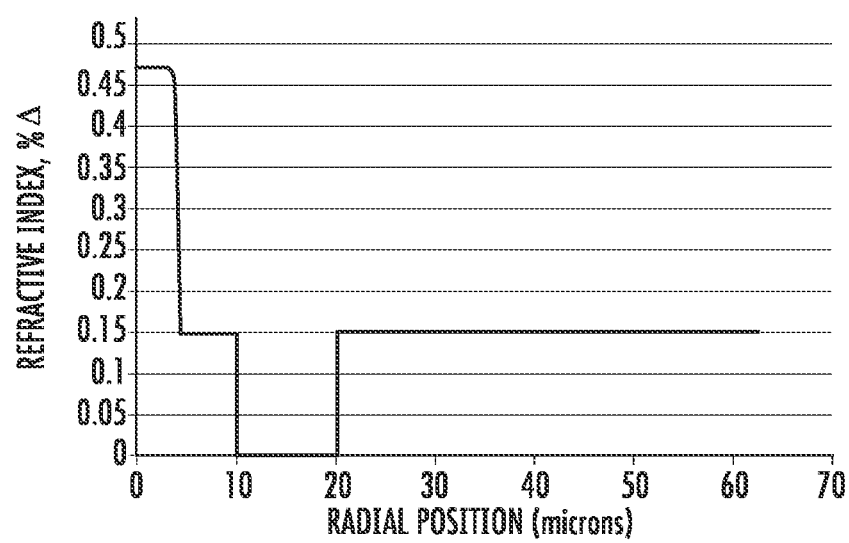
FIG. 10 shows a refractive index profile of an embodiment of an optical fiber as disclosed herein.
Figure 11:
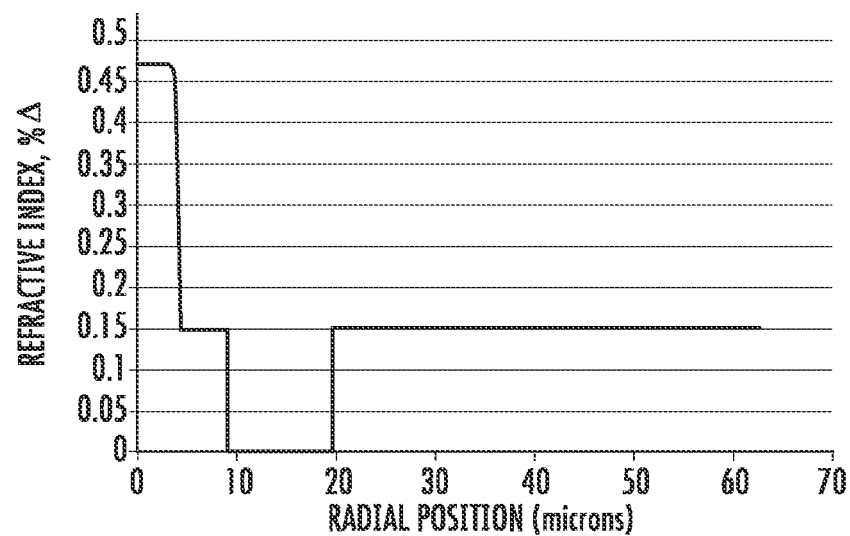
FIG. 11 shows a refractive index profile of an embodiment of an optical fiber as disclosed herein.
Figure 12:
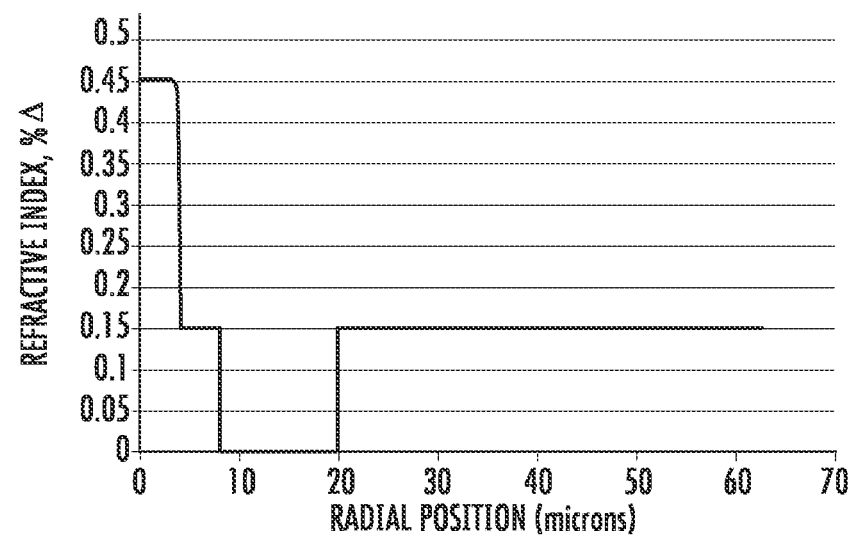
FIG. 12 shows a refractive index profile of an embodiment of an optical fiber as disclosed herein.

Table 1 below lists characteristics of fiber embodiments examples 1-3. These fiber embodiments have refractive index profiles as shown in FIGS. 10-12. In particular, set forth below for each example is the refractive index delta percent $\Delta_1$, alpha 1 ($\alpha 1$), and outer radius $r_1$ of the core 112; refractive index delta percent $\Delta_2$, and outer radius $r_2$ of the inner cladding region 121; and refractive index delta percent $\Delta_3$, and outer radius $r_3$, as well as profile volume $V_3$ of the trench region 122, which is calculated between $r_2$ and $r_3$; refractive index delta percent $\Delta_4$. Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, pin array macrobend at 1550 nm, zero dispersion wavelength (Lambda 0), 22 m cable cutoff, MAC number at 1310 nm, 1×15 mm diameter bend loss (bend loss when the fiber is turned once around a 15 mm diameter mandrel), and spectral attenuation at 1310 and 1550 nm.

TABLE 1

| Parameter | Ex 1 | Ex 2 | Ex 3 |
|---|---|---|---|
| $\Delta 1$max (%) | 0.47 | 0.47 | 0.45 |
| $r_1$ (micron) | 4.3 | 4.3 | 4.3 |
| Region12 Core Alpha | 20 | 20 | 20 |
| $\Delta 2$ (%) | 0.15 | 0.15 | 0.15 |
| $\Delta 1$-$\Delta 2$ | 0.32 | 0.32 | 0.30 |
| $r_2$ (micron) | 10 | 9 | 8.1 |
| $r_2/r_1$ | 2.3 | 2.1 | 1.9 |
| $\Delta 3$ (%) | 0.00 | 0.00 | 0.00 |
| $\Delta 2$-$\Delta 3$ | 0.15 | 0.15 | 0.15 |
| $r_3$ (micron) | 20 | 19.5 | 20 |
| $\Delta 4$ (%) | 0.15 | 0.15 | 0.15 |
| $r_4$ (micron) | 62.5 | 62.5 | 62.5 |
| Max chlorine concentration in outer cladding region 124, weight % | 1.5 | 1.5 | 1.5 |
| $\Delta 4$-$\Delta 3$ | 0.15 | 0.15 | 0.15 |
| V3 (% micron$^2$) | 45 | 45 | 50 |
| Dispersion at 1310 nm (ps/nm/km) | 4.9E-04 | 0.346 | 0.25 |
| Dispersion Slope at 1310 nm (ps/nm$^2$/km) | 0.088 | 0.099 | 0.091 |
| Lambda zero, nm | 1318 | 1315 | 1315 |
| Dispersion at 1550 nm (ps/nm/km) | 17.5 | 18 | 18 |
| Dispersion at Slope 1550 nm (ps/nm$^2$/km) | 0.062 | 0.062 | 0.063 |
| MFD at 1310 nm (micron) | 9.2 | 9.16 | 9.25 |
| MFD at 1550 nm (micron) | 10.44 | 10.34 | 10.38 |
| LLWM @ 1550 nm, dB/m | 0.6 | 0.56 | 0.77 |

TABLE 1-continued

| Parameter | Ex 1 | Ex 2 | Ex 3 |
|---|---|---|---|
| WMCD at 1550 nm, dB/km | 0.04 | 0.04 | 0.04 |
| Pin Array at 1550 nm, dB | 14.9 | 15.0 | 23.9 |
| Cable Cutoff (nm) | 1206 | 1206 | 1200 |
| Aeff at 1310 nm (micron$^2$) | 66.5 | 65.9 | 67.2 |
| Aeff at 1550 nm (micron$^2$) | 85.6 | 84.0 | 84.6 |
| MAC # (MFD at 1310 nm/Cable Cutoff) | 7.63 | 7.60 | 7.71 |
| 1 × 15 mm diameter bend loss at 1550 nm (dB/turn) | 0.19 | 0.2 | 0.29 |
| 1 × 20 mm diameter bend loss at 1550 nm (dB/turn) | 0.047 | 0.047 | 0.074 |
| 1 × 30 mm diameter bend loss at 1550 nm (dB/turn) | 0.0045 | 0.0045 | 0.01 |
| Attn at 1550 nm, dB/km | 0.18 | 0.18 | 0.18 |
| Attn at 1310 nm, dB/km | 0.32 | 0.32 | 0.32 |

As can be seen in Table 1 above, the exemplary fibers shown in Table 1 employ a glass core region 112 having index $\Delta_1$, an inner cladding region 121 having index $\Delta_2$, and cladding trench region 122 having refractive index delta percent $\Delta_3$, and an outer cladding region 124 having refractive index delta percent $\Delta_4$; wherein $\Delta_{1max} > \Delta_2$; $\Delta_{1max} > \Delta_4$; $\Delta_3 > \Delta_2$; $\Delta_4 > \Delta_3$, wherein the difference between $\Delta_{1max}$ and $\Delta_2$ is greater than or equal to at least 0.15, difference between $\Delta_{1max}$ and $\Delta_3$ is greater than or equal to at least 0.35 (e.g., $0.38 \leq \Delta_{1max} - \Delta_3 \leq 0.65$); the difference between $\Delta_2$ and $\Delta_3$ is greater than or equal to at least 0.08 (e.g., $0.08 \leq \Delta_2 - \Delta_2 \leq 0.4$); and the difference between $\Delta_4$ and $\Delta_3$ is greater than or equal to at least 0.08 (e.g., $0.1 \leq \Delta_4 - \Delta_3 \leq 0.4$, or $0.1 \leq \Delta_4 - \Delta_3 \leq 0.3$); and the absolute value of profile volume, $|V_3|$ is at least 30% micron$^2$. These fibers have mode field diameters (MFD) at 1310 nm between 9 microns and 9.5 micron, for example between 9.2 microns and 9.5 microns and a zero dispersion wavelength between 1300 nm and 1324 nm.

Figure 13:
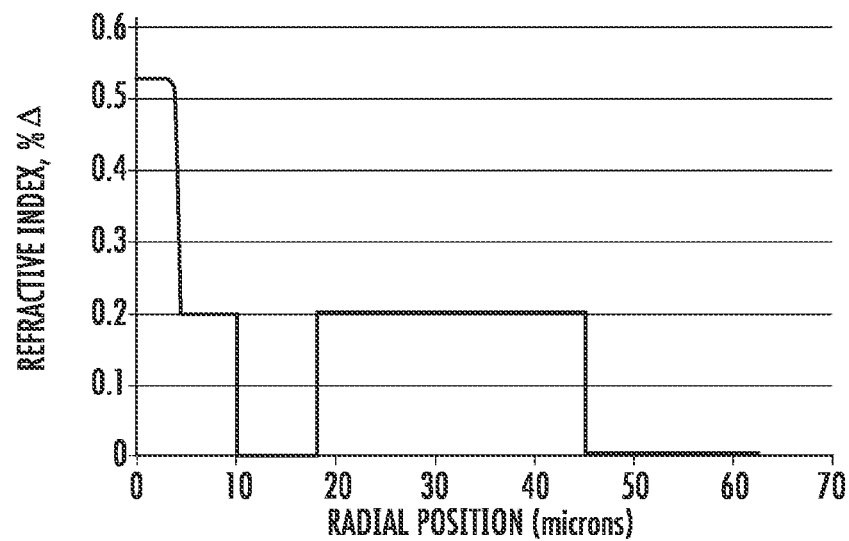
FIG. 13 shows a refractive index profile of an embodiment of an optical fiber as disclosed herein.

Table 2 below lists characteristics of a fiber example 4 embodiment. This fiber embodiments has the refractive index profile as shown in FIG. 13.

TABLE 2

| Parameter | Ex 4 |
|---|---|
| $\Delta 1$ max (%) | 0.53 |
| $r_1$ (micron) | 4.4 |
| Region12 Core Alpha | 20 |
| $\Delta 2$ (%) | 0.2 |
| $\Delta 1$-$\Delta 2$ | 0.33 |
| $r_2$ (micron) | 10 |
| $r_2/r_1$ | 2.27 |
| $\Delta 3$ (%) | 0.00 |
| $\Delta 2$-$\Delta 3$ | 0.2 |
| $r_3$ (micron) | 18.2 |

TABLE 2-continued

| Parameter | Ex 4 |
|---|---|
| Δ4 (%) | 0.2 |
| $r_{4a}$(micron) | 45 |
| Max chlorine concentration. in outer cladding region 124, weight % | 2 |
| Δ4-Δ3 | 0.2 |
| Δ5 (%) | 0 |
| $r_4$(micron) | 62.5 |
| V3 (% micron2) | 46.2 |
| Dispersion at 1310 nm (ps/nm/km) | 0.483 |
| Dispersion Slope at 1310 nm (ps/nm$^2$/km) | 0.089 |
| Lambda zero, nm | 1312 |
| Dispersion at 1550 nm (ps/nm/km) | 18.1 |
| Dispersion at Slope 1550 nm (ps/nm$^2$/km) | 0.062 |
| MFD at 1310 nm (micron) | 9.16 |
| MFD at 1550 nm (micron) | 10.31 |
| LLWM @ 1550 nm, dB/m | 0.4 |
| WMCD at 1550 nm, dB/km | 0.04 |
| Pin Array at 1550 nm, dB | 8.96 |
| Cable Cutoff (nm) | 1257 |
| Aeff at 1310 nm (micron$^2$) | 66.1 |
| Aeff at 1550 nm (micron$^2$) | 81.7 |
| MAC # (MFD at 1310 nm/Cable Cutoff) | 7.29 |
| 1 × 15 mm diameter bend loss at 1550 nm (dB/turn) | 0.102 |
| 1 × 20 mm diameter bend loss at 1550 nm (dB/turn) | 0.023 |
| 1 × 30 mm diameter bend loss at 1550 nm (dB/turn) | 0.002 |
| Attn at 1550 nm, dB/km | 0.18 |
| Attn at 1310 nm, dB/km | 0.32 |

As can be seen in Table 2 above, the exemplary fibers such as that depicted in FIG. 9 and FIG. 13 employ a glass core region 112 having refractive index delta percent $\Delta_{1max}$, an inner cladding region 121 having refractive index delta percent $\Delta_2$, and trench region 122 having refractive index delta percent $\Delta_3$, and an first outer cladding region 123 having refractive index delta percent $\Delta_4$ and a second outer cladding region 125 having a refractive index delta percent $\Delta_5$; wherein $\Delta_{1max}>\Delta_2$; $\Delta_{1max}>\Delta_4$; $\Delta_3>\Delta_2$; $\Delta_4>\Delta_3$, wherein the difference between $\Delta_{1max}$ and $\Delta_2$ is greater than or equal to at least 0.15, difference between $\Delta_{1max}$ and $\Delta_3$ is greater than or equal to at least 0.35 (e.g., $0.38 \leq \Delta_{1max}-\Delta_3 \leq 0.65$); the difference between $\Delta_2$ and $\Delta_3$ is greater than or equal to at least 0.08 (e.g., $0.08 \leq \Delta_2-\Delta_2 \leq 0.4$); and the difference between $\Delta_4$ and $\Delta_3$ is greater than or equal to at least 0.08 (e.g., $0.1 \leq \Delta_4-\Delta_3 \leq 0.4$, or $0.1 \leq \Delta_4-\Delta_3 \leq 0.3$); and an absolute value of profile volume, $|V_3|$ of at least 30% micron$^2$. In this embodiment, the cladding region 125 is a silica layer with a relative refractive index percent of about zero. The cladding region 125 (i.e., the second outer cladding region) acts as a stiff tension absorbing layer. This fiber embodiment has a mode field diameter (MFD) at 1310 nm between 9 microns and 9.5 micron, and a zero dispersion wavelength between 1300 nm and 1324 nm.

The fiber embodiments described herein exhibit a cable cutoff less than or equal to 1260 nm and a bend loss of ≤0.5 dB/turn when wound upon on a 15 mm diameter mandrel. These fibers also exhibit a mode field diameter between about 9 and 9.5 microns at 1310 nm, a zero dispersion wavelength between 1300 and 1324 nm, a dispersion slope at 1310 nm which is less than or equal to 0.092 ps/nm$^2$/km. These fibers exhibit a Wire Mesh Covered Drum (WMCD) bend loss at 1550 nm which is less than or equal to 0.07 dB/km, in some embodiments less than or equal to 0.06 dB/km, and in some embodiments less than or equal to 0.05 dB/km. These fibers also exhibit a pin array bend loss at 1550 nm which is less than 8.5 dB, in some embodiments less than 5 dB and in some embodiments less than 4 dB. These fibers exhibit a Basketweave microbend loss at 1550 nm which is less than or equal to 0.05 dB/km, in some embodiments less than or equal to 0.025 dB/km, and in some embodiments less than or equal to 0.01 dB/km.

Many of these fibers also exhibit a bend loss at 1550 nm, when wound upon on a 15 mm diameter mandrel, of ≤0.5 dB/turn, and in some cases ≤0.2 dB/turn. These fibers also exhibit a bend loss at 1550 nm, when wound upon on a 20 mm diameter mandrel, of ≤0.2 dB/turn, in some embodiments ≤0.15 dB/turn, and some fibers in some embodiments ≤0.1 dB/turn. These fibers also exhibit a bend loss at 1550 nm, when wound upon on a 30 mm diameter mandrel, of ≤0.02 dB/turn, for example ≤0.005 dB/turn, or even ≤0.003 dB/turn.

Such bend loss and attenuation performance numbers are attainable using a primary and secondary coating applied to the fiber, wherein the Young's modulus of the primary is less than 2 MPa, in some embodiments ≤1 MPa, and in some embodiments ≤0.5 MPa. The Young's modulus of the secondary coating is greater than 500 MPa, in some embodiments greater than 1000 MPa, and in some embodiments greater than 1500 MPa. In some embodiments, the outer diameter of the secondary coating is 242 microns. In some other embodiments, the outer diameter of the secondary coating is 200 microns.

Figure 14:
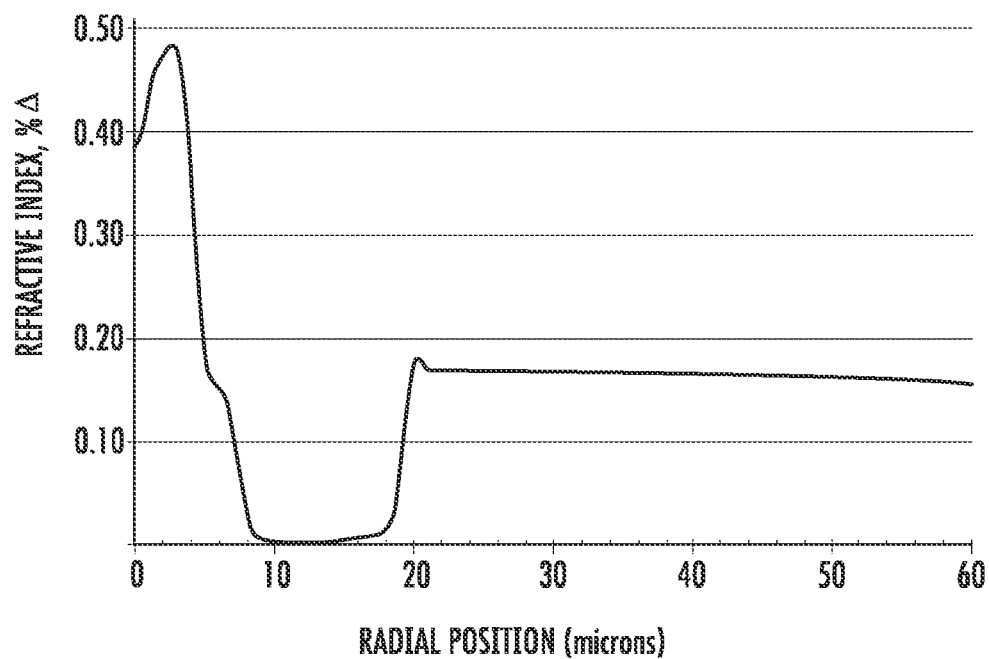
FIG. 14 shows a refractive index profile of an embodiment of an optical fiber as disclosed herein.

Table 3 provides data of a manufactured optical fiber embodiment (Example 5 fiber). The refractive index profile of optical fiber example 5 fiber is illustrated in FIG. 14.

TABLE 3

Data for manufactured optical fiber

| Parameter | Ex 5 |
|---|---|
| $\Delta_{1max}$ (%) | 0.48 |
| $r_1$ (microns) | 4.87 |
| Core Alpha, α | 20 |
| $r_2$ (microns) | 6.11 |
| $r_2/r_1$ | 1.25 |
| $\Delta_2$ (%) | 0.153 |
| $R_3$ (microns) | 19.8 |
| $\Delta_3$ (%) | 0 |
| $V_3$(% Δ micron$^2$) | 60 |
| $\Delta_4$ (%) | 0.168 |
| Chlorine conc. in outer cladding region 124, weight % | 1.7 |
| $r_4$ (microns) | 62.5 |
| Dispersion at 1310 nm (ps/nm/km) | 0.565 |
| Dispersion Slope at 1310 nm (ps/nm$^2$/km) | 0.091 |
| Dispersion at 1550 nm (ps/nm/km) | 18.1 |
| Zero Dispersion Wavelength (nm) | 1304 |
| MFD at 1310 nm (microns) | 9.34 |
| MFD at 1550 nm (microns) | 10.45 |
| Aeff at 1550 nm (micron$^2$) | 85.8 |
| Cable Cutoff (nm) | 1204 |
| Macrobend Loss for 15 mm mandrel diameter at 1550 nm (dB/turn) | 0.078 |
| Macrobend Loss for 20 mm mandrel diameter at 1550 nm (dB/turn) | 0.084 |
| Macrobend Loss for 30 mm mandrel diameter at 1550 nm (dB/turn) | 0.005 |

TABLE 3-continued

Data for manufactured optical fiber

| Parameter | Ex 5 |
|---|---|
| Microbend loss at 1550 nm in Basket-weave test at −60 C. for 242 microns coating diameter (dB/km) | 0.005 |
| Microbend loss at 1550 nm in Basket-weave test at −60 C. for 200 microns coating diameter (dB/km) | 0.03 |
| Microbend loss at 1550 nm in Basket-weave test at −60 C. for 200 microns coating diameter (dB/km) | 0.03 |

In the embodiment of Table 3, the optical fibers exhibits a basketweave microbend loss at −60° C. at 1550 nm which is less than or equal to 0.05 dB/km, for example less than or equal to 0.03 dB/km.

In some embodiments, the fiber core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core 112 and a cladding 120 surrounding and directly adjacent to the core. According to some embodiments, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In embodiments, the core region 112 of the optical fiber 110 disclosed herein has a non-negative refractive index profile, more preferably a positive refractive index profile, with the inner cladding region 121 surrounding and directly adjacent to core region 112.

In various embodiments discussed herein, the optical fibers include one or more protective layer (e.g., polymer layers) located outside of and surrounding outer cladding region 124, and in at least some embodiments, these protective layers are configured to provide puncture resistance to the optical fiber. For example, the optical fiber disclosed herein may be surrounded by a protective coating, e.g. a primary coating P contacting and surrounding the outer cladding region 124. In various embodiments, the primary coating P has a Young's modulus of ≤1.0 MPa, in some embodiments, ≤0.9 MPa, and in some embodiments not more than 0.8 MPa. In various embodiments, the optical fibers discussed herein further includes a secondary coating S contacting and surrounding the primary coating P. In various embodiments, the secondary coating S has a Young's modulus of greater than 1200 MPa, and in some embodiments greater than 1400 MPa. In some embodiments, optical fibers discussed herein include a primary coating P have intrinsic modulus of elasticity ≤0.5 MPa, specifically ≤0.2 MPa and even more preferably ≤0.15 MPa, while glass transition temperature is between −25 and −35 degrees C., and in some such embodiments, the diameter of the primary coating is preferably ≤165 um, specifically ≤160 um and even more specifically ≤150 um, and in such embodiments, the secondary coating diameter is ≤250 microns and more specifically is ≤210 microns. In various embodiments, the secondary coating has a modulus of elasticity larger than 1200 MPa, specifically larger than 1500 MPa and more specifically larger than 1800 MPa. In particular embodiments, reduced diameter optical fibers discussed herein have secondary coatings with modulus of elasticity of larger than 1700 MPa have a puncture resistance load of larger than 25 g, as shown in Table 4 below. The test method for the puncture resistance of the optical fiber coating can be found in $52^{nd}$ IWCS (International Wire and Cable Symposium) Proceedings, p. 237-245.

TABLE 4

Puncture resistance testing for reduced diameter optical fibers

| Fiber | Secondary coating cross-sectional area, microns$^2$ | Minimal puncture load, grams |
|---|---|---|
| 1 | 9450 | 28.0 |
| 2 | 10912 | 26.8 |
| 3 | 11306 | 28.2 |

According to some embodiments, with primary and secondary coatings, the outer diameter of the secondary coating is ≤250 microns. According to some embodiments the fiber further is coated with primary and secondary coatings, and the outer diameter of the secondary coating is ≤210 microns. According to some embodiments the fiber further is coated with primary and secondary coatings, and the outer diameter of the secondary coating is ≤190 microns.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, especially in the E-band. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of ≤0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low PMD values particularly when fabricated with OVD processes. Spinning of the optical fiber may also lower PMD values for the fiber disclosed herein.

High Density Cable Examples

Table 5 shows modeled results for optical fiber cable designs having fibers disclosed herein. Shown in the table below, these exemplary embodiments include buffer tube diameter, buffer tube wall thickness, number of optical fibers in each buffer tube, the diameter of the optical fiber including the coating and coloring layers, the overall number of optical fibers in the cable, the number of buffer tubes in the cable, the central member minimum diameter (including the strength elements and upjacketing), the minimum cable core diameter, the fiber density in the cable core and the Ω parameter (fiber diameter/inside diameter of the buffer tube). Optical fiber cables in these examples can include stranding of the buffer tubes, stranding binder yarns and/or thin film binder to hold the buffer tubes, additional strength members outside the cable core, armor, and cable jacketing.

optical fibers in each buffer tube from 8 to 24, the diameter of the optical fiber including the coating and coloring layers from 0.21 to 0.25 mm, the overall number of optical fibers in the cable from 72 to 288, the number of buffer tubes in the cable from 6 to 12, the central member minimum diameter, including the strength elements and upjacketing (e.g., polymer coating on the strength elements,) from 0.88 mm to 4.37 mm, the minimum cable core diameter from 3.22 mm and 7.41 mm, the fiber density in the cable core from $3.49/mm^2$ and $17.64/mm^2$, and the Ω parameter (fiber diameter/inside diameter of the buffer tube) from 3.67 and 5.81. The examples herein show that the diameter ratio parameter Ω ranges from $2.25+0.143(N) \leq \Omega \leq 1.14+0.313(N)$ and in some preferred embodiments ranges from $2.25+0.143(N) \leq \Omega \leq 2.66+0.134(N)$.

Low Attenuation Buffer Tubes/Cables with Small Particle Additive

In addition to the designs discussed above, Applicant has identified that one source of bend related attenuation within a fiber optic cable/buffer tube is bending losses (e.g., microbending losses) associated with interaction between optical fibers and large sized particles (e.g., large water absorbing particles such as SAP particles). In conventional

TABLE 5

Optical Fiber Cables

| Parameter | Example 1 | Example 2 | Example 3 | Example 4 | Example 5 | Example 6 | Example 7 |
|---|---|---|---|---|---|---|---|
| Buffer Tube Inside Diameter, mm | 0.92 | 0.77 | 0.89 | 0.89 | 0.84 | 0.84 | 0.84 |
| Buffer Tube Thickness, mm | 0.15 | 0.15 | 0.15 | 0.15 | 0.15 | 0.10 | 0.05 |
| Number of Fibers in buffer Tube | 8 | 8 | 12 | 12 | 12 | 12 | 12 |
| Coated + Colored Fiber Diameter, mm | 0.25 | 0.21 | 0.21 | 0.21 | 0.21 | 0.21 | 0.21 |
| Overall fiber count in Cable | 96 | 96 | 72 | 144 | 144 | 144 | 144 |
| Buffer tubes in cable | 12 | 12 | 6 | 12 | 12 | 12 | 12 |
| Min central member diameter, mm | 3.48 | 3.06 | 1.19 | 3.41 | 3.28 | 2.99 | 2.71 |
| Min Cable Core Diameter, mm | 5.92 | 5.20 | 3.57 | 5.79 | 5.56 | 5.07 | 4.59 |
| Fiber density in Cable Core ($N/mm^2$) | 3.49 | 4.51 | 7.19 | 5.47 | 5.93 | 7.12 | 8.72 |
| Omega | 3.68 | 3.67 | 4.24 | 4.24 | 4.00 | 4.00 | 4.00 |

| Parameter | Example 8 | Example 9 | Example 10 | Example 11 | Example 12 | Example 13 | Example 14 |
|---|---|---|---|---|---|---|---|
| Buffer Tube Inside Diameter, mm | 1.20 | 1.22 | 1.22 | 0.99 | 0.87 | 1.22 | 1.22 |
| Buffer Tube Thickness, mm | 0.15 | 0.15 | 0.10 | 0.10 | 0.15 | 0.15 | 0.15 |
| Number of Fibers in buffer Tube | 24 | 24 | 24 | 24 | 24 | 24 | 24 |
| Coated + Colored Fiber Diameter, mm | 0.21 | 0.21 | 0.21 | 0.17 | 0.15 | 0.21 | 0.21 |
| Overall fiber count in Cable | 144 | 144 | 144 | 144 | 144 | 288 | 288 |
| Buffer tubes in cable | 6 | 6 | 6 | 6 | 6 | 12 | 12 |
| Min central member diameter, mm | 1.50 | 1.53 | 1.43 | 1.19 | 0.88 | 4.37 | 4.37 |
| Min Cable Core Diameter, mm | 4.50 | 4.57 | 4.27 | 3.57 | 3.22 | 7.41 | 7.41 |
| Fiber density in Cable Core ($N/mm^2$) | 9.05 | 8.77 | 10.04 | 14.36 | 17.64 | 6.67 | 6.67 |
| Omega | 5.71 | 5.81 | 5.81 | 5.82 | 5.80 | 5.81 | 5.81 |

The cable examples in Table 5 show cables comprising buffer tube inner diameters between 0.75 to 1.25 mm, buffer tube wall thicknesses of 0.05 to 0.15 mm, the number of buffer tube cable designs, large sized particles, such as SAP particles, (e.g., SAP particles having diameters greater than 50 microns, greater than or equal to 75 microns, etc.) are thought to be advantageous due to manufacturing advantages, such as ease of particle handling during cable/buffer tube assembly, and due to commercial availability of large sized particle material.

In contrast to conventional designs, Applicant has discovered that utilization of small diameter particles in applications where contact between the particles and the optical fibers will occur significantly decreases signal attenuation, e.g., during bending and/or thermal cycling. The improved signal attenuation performance provided by the small diameter particles discussed herein is even more significant when used in conjunction with densely packed buffer tubes/cables as discussed herein. Specifically, in the case of densely packed buffer tube/cable designs discussed herein, the small diameter particles allow for sufficiently high particle quantities within the buffer tube/cable to provide the desired particle functionality (e.g., water absorption/blocking of SAP particles, flame reduction in the case of flame retardant particles, etc.) without the particles unduly constraining/impacting optical fibers during bending/thermal cycling which would otherwise result in significant signal attenuation.

Figure 15:
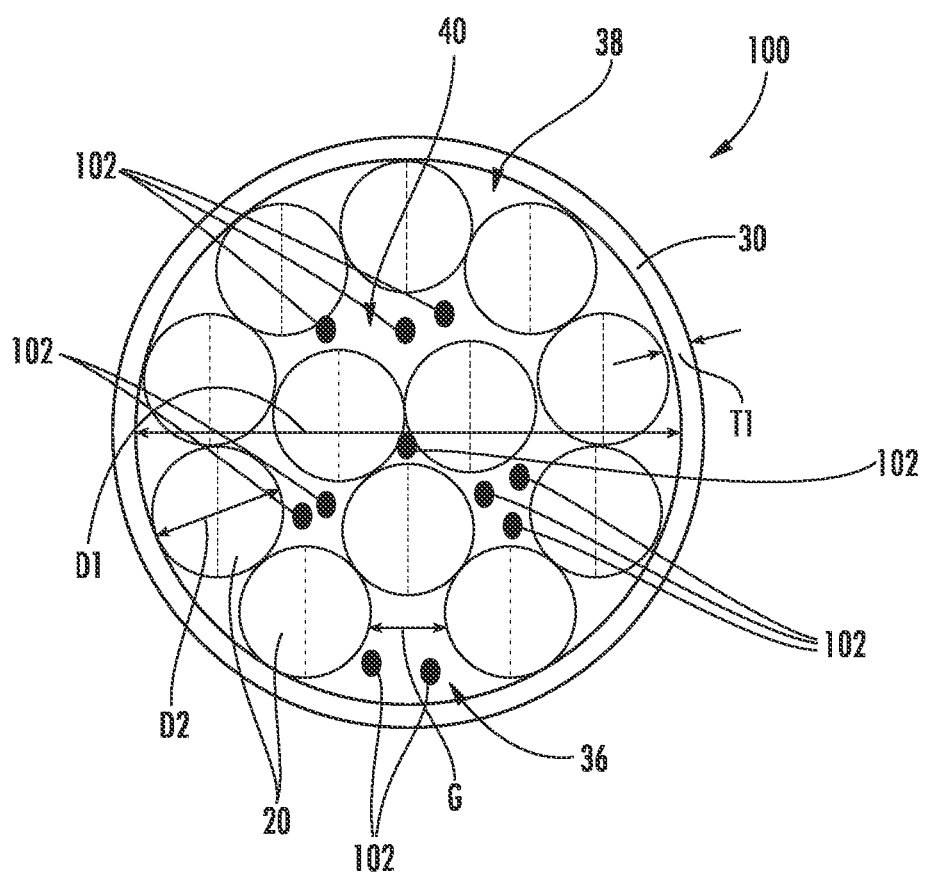
FIG. 15 shows a cross-sectional view of an optical fiber buffer tube including small sized active particles according to an exemplary embodiment.

Referring to FIG. 15, a buffer tube 100 including a plurality of small active particles, shown as small sized particles 102, is shown according to an exemplary embodiment. In the specific embodiment shown, buffer tube 100 is substantially the same as densely packed buffer tube 22' discussed above. As used herein, active particles include particles of functionally active materials, such as water absorbing materials, including super absorbing polymer particles (SAP), including particles of sodium or potassium sodium acrylate or acrylamide copolymer, fire retardant materials, including magnesium hydroxide and aluminum trihydrate particles, and smoke suppressant powders, including molybdenum based particles. Further, as used herein active particles exclude inert or inactive particles, such as talc, PTFE and graphite powders, etc. that have been or could be used for various purposes such as slip agents in some cable designs.

Further, it should be understood that, the small active particles discussed herein may be used in conjunction with any of the buffer tube and cable embodiments discussed herein. In various embodiments, the small active particles discussed herein may be incorporated into buffer tubes 22, 22" and 22'" discussed above and into cables 10, 60, 70, 80 and 90 discussed above. In the case of ribbon cable 90, the small active particles discussed herein may be located in the central cavity of buffer tube 92 surrounding optical fiber ribbons 96, and in the case of cables 10, 60, 70 and 80, the small active particles discussed herein may be located in the central cavity around the outer surfaces of the buffer tubes instead of or in addition to also being located within the buffer tubes.

Figure 16:
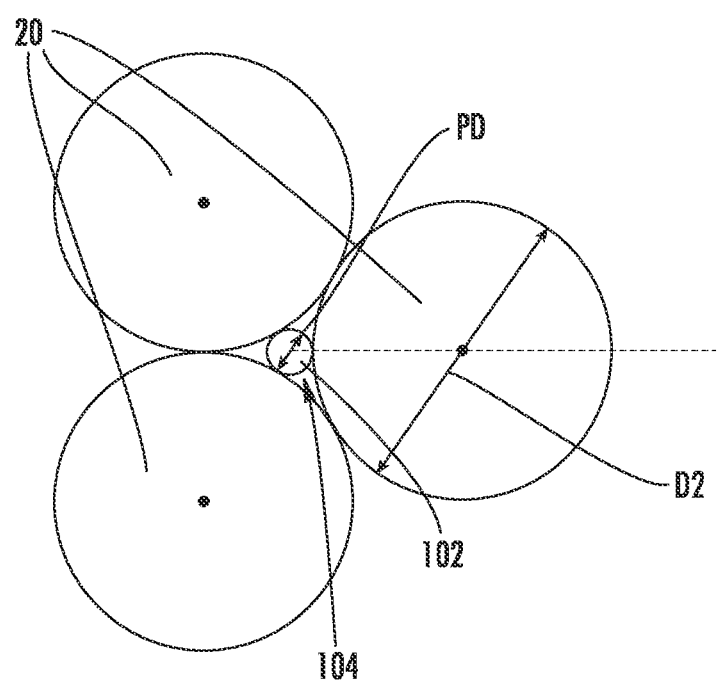
FIG. 16 is a schematic cross-sectional view showing a small sized active particle located within a space between optical fibers within the buffer tube of FIG. 15, according to an exemplary embodiment.

Referring to FIG. 16, a detailed view of densely packed central optical fibers 20 of buffer tube 100 are shown with small diameter particle 102. In general, Applicant has discovered that the maximum outer dimension of particles 102, shown as dimension PD, that is permitted without causing significant particle-based attenuation is related to the size of the spaces between the adjacent optical fibers 20 within buffer tube 100. In general, Applicant has discovered that the interaction/contact between optical fibers 20 and particles 102 that occurs during bending, thermal cycling, etc. increases signal attenuation (e.g., microbending losses) experienced by the optical fibers of buffer tube 100.

Thus, as can be seen from the geometry shown in FIG. 16, as the optical fiber diameter D2 increases, the size of spaces, such as central space 104, increases, and thus, the maximum allowable PD increases as optical fiber diameter increases. In addition, as optical fibers 20 become less densely packed within buffer tube 100 (e.g., in the case of buffer tubes 22" and 22'" discussed above regarding FIGS. 2B and 2C), the size of spaces, such as central space 104, increases, and thus, the maximum allowable PD increases as fiber packing density decreases. It should be understood, that while FIG. 16 shows particle 102 as spherically shaped, particles may be non-spherical in shape, and in such embodiments, PD is the largest outer dimension of the non-spherical particle.

In various embodiments, particles 102 are sized such that the average of the maximum outer particle dimension, PD, of particles 102 is ≤50 microns, specifically is ≤38 microns, and more specifically is ≤25 microns. In some such embodiments, PD is also >1 micron and more specifically >10 microns. Thus, by utilizing particles having a maximum PD ≤50 microns, ≤38 microns or ≤25 microns, low microbend attenuation can be achieved. Further, by utilizing particles having a PD that is at least 1 micron or at least 10 micron, a sufficient level of manufacturability and ability to handle the particulate material during manufacturing is believed to be achievable.

In specific embodiments, the maximum PD of all particles 102 used within buffer tube 100 is between 1 micron and 50 microns (inclusive), 1 micron and 38 microns (inclusive), 1 micron and 25 microns (inclusive), 10 microns and 50 microns (inclusive), 10 microns and 38 microns (inclusive), 10 microns and 25 microns (inclusive). In specific embodiments, the particles 102 used within a buffer tube 22 have a very low number of particles falling outside of the PD ranges discussed above. For example in specific embodiments, particles 102 are sized such that less than 50%, specifically less than 30%, specifically less than 10% and more specifically less 1% of particles 102 within buffer tube 22 have a PD greater than 50 microns, greater than 38 microns or greater than 25 microns. In addition, in specific embodiments, particles 102 are sized such that less than 50%, specifically less than 30%, specifically less than 10% and more specifically less 1% of particles 102 within buffer tube 22 have a PD ≤10 microns or ≤1 micron.

As can be seen in FIG. 16, because the sizes of the spaces between fibers, such as central space 104, increases as the diameter of optical fibers 20 increases, Applicant has discovered that the low attenuation, upper size limit of particles 102 is related to optical fiber diameter, D2. Thus, in various embodiments, average PD is less than 30% of D2, specifically less than 25% of D2, and more specifically less than 20% of D2. In some embodiments, average PD is between 1% and 30% of D2, specifically between 1% and 25% of D2 and more specifically between 1% and 20% of D2. In even more specific embodiments, average PD is between 10% and 30% of D2, specifically between 10% and 25% of D2 and more specifically between 10% and 20% of D2. In specific embodiments, average PD is between 14% and 18% of D2, and more specifically between 15% and 17% of D2.

Similarly, in various embodiments, the PD of at least 50% of particles 102 within buffer tube 100 is less than 30% of D2, specifically less than 25% of D2, and more specifically less than 20% of D2. In some embodiments, the PD of at least 50% of particles 102 within buffer tube 100 is between 1% and 30% of D2, specifically between 1% and 25% of D2 and more specifically between 1% and 20% of D2. In even more specific embodiments, the PD of at least 50% of particles 102 within buffer tube 100 is between 10% and 30% of D2, specifically between 10% and 25% of D2 and more specifically between 10% and 20% of D2. In specific embodiments, the PD of at least 50% of particles 102 within buffer tube 100 is between 14% and 18% of D2, and more specifically between 15% and 17% of D2.

In yet other various embodiments, the PD of at least 90% of particles 102 within buffer tube 100 is less than 30% of D2, specifically less than 25% of D2, and more specifically less than 20% of D2. In some embodiments, the PD of at least 90% of particles 102 within buffer tube 100 is between 1% and 30% of D2, specifically between 1% and 25% of D2 and more specifically between 1% and 20% of D2. In even more specific embodiments, the PD of at least 90% of particles 102 within buffer tube 100 is between 10% and 30% of D2, specifically between 10% and 25% of D2 and more specifically between 10% and 20% of D2. In specific embodiments, the PD of at least 90% of particles 102 within buffer tube 100 is between 14% and 18% of D2, and more specifically between 15% and 17% of D2.

In specific embodiments, as noted above, buffer tube 100 is a small diameter buffer tube, such as buffer tube 22, 22', 22" and 22''', and optical fibers 20 are small diameter, bend resistant optical fibers as discussed above. In some such embodiments, D2 is ≤210 microns and more specifically is 208 microns, and in such embodiments, average PD is less or equal to 32 microns, specifically is greater than 1 micron and less or equal to 32 microns. In other embodiments, buffer tube 100 may be a standard buffer tube and optical fibers 20 may be standard sized optical fibers having a diameter D2, of about 250 microns, in such embodiments, average PD is less than or equal to 39 microns, specifically is greater than 1 micron and less or equal to 39 microns.

In specific embodiments, buffer tube 100 is a polypropylene buffer tube having an outer diameter of 2.5 mm and an inner diameter D1 of 1.6 mm and includes 12 optical fibers 20 each having an outer diameter D2 of 250 microns. In other specific embodiments, buffer tube 100 is a polypropylene buffer tube for a drop cable having an outer diameter of 3.0 mm and an inner diameter D1 of 1.8 mm and includes 12 optical fibers 20 each having an outer diameter D2 of 250 microns. In other specific embodiments, buffer tube 100 is a PBT buffer tube having an outer diameter of 2.5 mm and an inner diameter D1 of 1.8 mm and includes 12 optical fibers 20 each having an outer diameter D2 of 250 microns. In other specific embodiments, buffer tube 100 is a PBT buffer tube for a drop cable having an outer diameter of 2.85 mm and an inner diameter D1 of 2.05 mm and includes 12 optical fibers 20 each having an outer diameter D2 of 250 microns. In other specific embodiments, buffer tube 100 has an inner diameter D1 of 1.1 mm and includes 12 optical fibers 20 each having an outer diameter D2 of 250 microns. In other specific embodiments, buffer tube 100 has an inner diameter D1 of 1.4 mm and includes 24 optical fibers 20 each having an outer diameter D2 of 250 microns. In other specific embodiments, buffer tube 100 has an inner diameter D1 of 1.18 mm and includes 24 optical fibers 20 each having an outer diameter D2 of 208 microns. In all such embodiments, the buffer tubes discussed herein include active particles, such as particles 102, having an average PD that is less than or equal to 39 microns, specifically is greater than 1 micron and less or equal to 39 microns.

Figure 17:
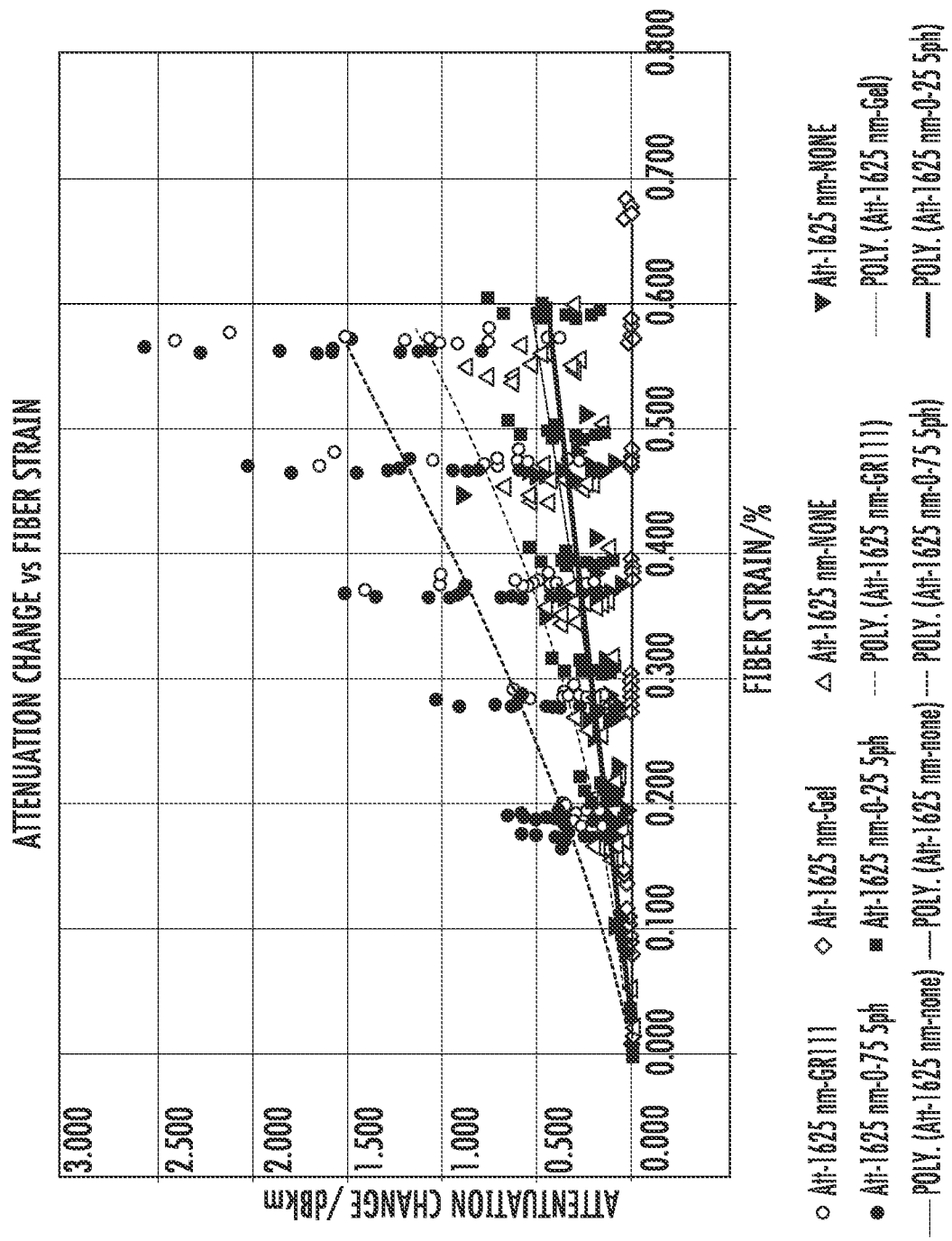
FIG. 17 is a graph showing signal attenuation change vs. fiber strain for various optical cables having different sized SAP particles/materials, according to an exemplary embodiment.
Figure 18A:
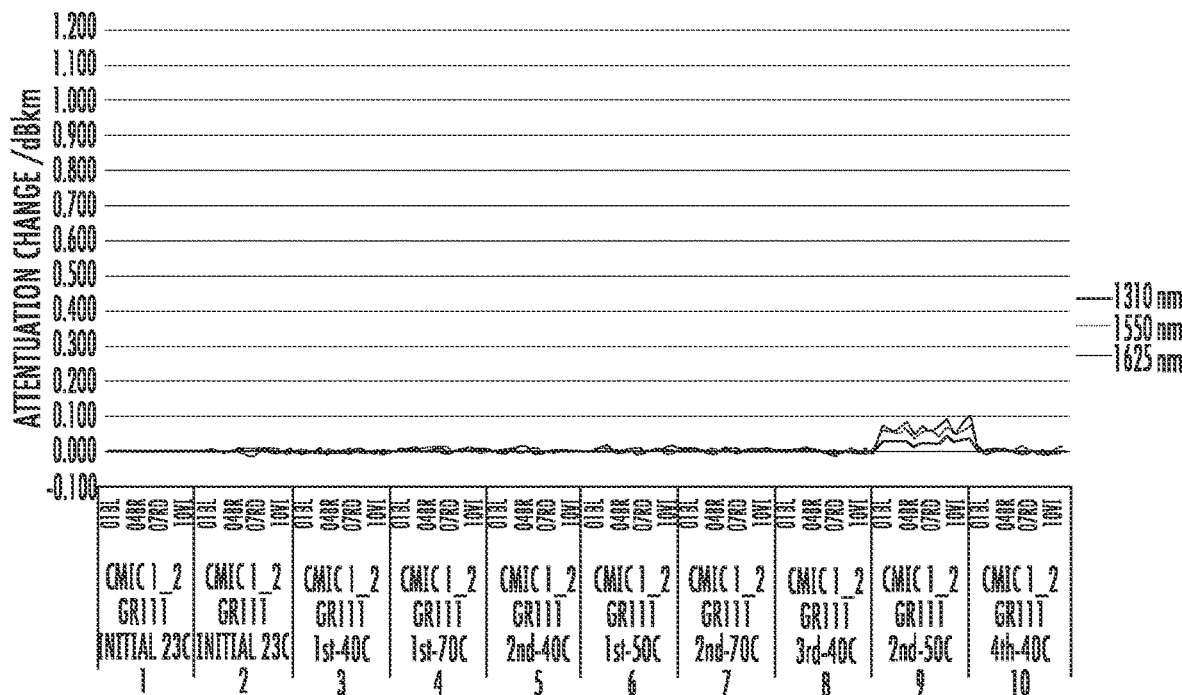
FIG. 18A is a graph showing signal attenuation during thermal cycling for optical fibers within buffer tubes having conventional 75 micron SAP particles.
Figure 18B:
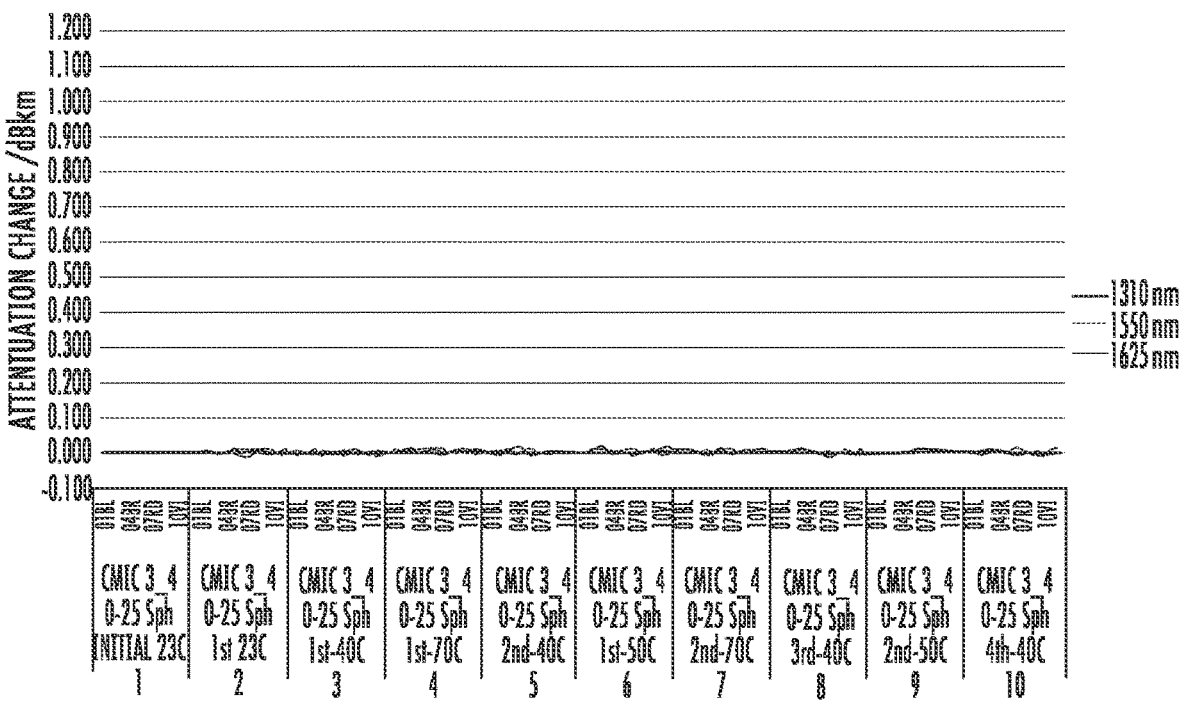
FIG. 18B is a graph showing signal attenuation during thermal cycling for optical fibers within buffer tubes having small diameter 25 micron SAP particles, according to an exemplary embodiment.

Referring to FIGS. 17, 18A and 18B, the attenuation performance of buffer tube 100 (or cables including buffer tubes 100) and small diameter particles 102 are shown compared to various other cable designs. FIG. 17 shows attenuation change at 1625 nm as a function of strain for a 72 single-mode fiber 6 position cable, having different sized SAP particles, gel or no particles. Results show that buffer tubes utilizing novel small active particles, SAP having an average PD of 25 microns, has substantially improved attenuation compared to buffer tubes having standard SAP GR-111 powder (non-spherical particles having average PD of 75 micron).

FIG. 18A shows attenuation change at 1310, 1550 and 1625 nm as a function of thermal cycling for a 72 single-mode fiber 6 position cable with buffer tubes having standard SAP GR-111 powder (non-spherical particles having average PD of 75 micron). As can be seen in FIG. 18A, during cycle 9 (−50 degrees C.), attenuation increase is observed. In contrast, FIG. 18B shows the same thermal cycling test as FIG. 18A, but utilizing a 72 single-mode fiber 6 position cable with buffer tubes having the novel small active particles, SAP having an average PD of 25 microns. As can be seen in FIG. 18B, by utilizing the SAP having an average PD of 25 micron, no significant attenuation is observed, even during cycle 9 (−50 degrees C.).

In addition to providing the low attenuation performance discussed above, the small sized particles, particularly small sized SAP particles, are believed to provide a variety of additional benefits to buffer tube 100 (as compared to conventional buffer tubes utilizing 75 micron SAP). Applicant has discovered that the small sized SAP particles discussed herein have significantly higher water absorption and has higher cohesion following water absorption than standard sized SAP particles. Thus, in specific embodiments, because of the increased absorption and/or increased cohesion, the small sized SAP particles discussed herein allow for formation of buffer tubes with very low quantities of SAP. In specific embodiments, buffer tube 100 has less than 10 mg of SAP particles 102 per meter length of buffer tube, specifically less than 5 mg of SAP particles 102 per meter length of buffer tube, and more specifically less than 1 mg of SAP particles 102 per meter length of buffer tube. In such embodiments, these low levels of SAP particles 102 still provide sufficient levels of water blocking, such that liquid water (at room temperature of about 20-25° C.) and 1 meter head height does not migrate more than 1 meter inside the buffer tube in a 14 days period. The optical fiber cable water penetration test is as prescribed by IEC-60794-1-2-F5B. These low levels of SAP are in contrast to buffer tubes that utilize standard 75 micron SAP particles that typically has 10 mg/meter or more of 75 micron SAP.

In particular, Applicant has identified that smaller diameter SAP particles absorb more water per gram of SAP powder as compared to SAP having larger particle sizes. Water absorption by SAP powder is tested by the following procedure: in a covered container to limit evaporation, deionized water is added to 100 mg of SAP powder to form a saturated gel (i.e., no visible liquid water) and held over a 1 hour period and weighed to determine the water absorbency in grams of $H_2O$ per gram of SAP. Table 6 below shows that SAP powder particles having an average PD of 25 microns (spherical particles having a diameter in the range of 4-35 microns) absorb greater than or equal to 220 grams of water for each gram of SAP particle material. The SAP powder particles having an average PD of 63 microns (spherical particles having a range of 16-70 microns) absorb greater than or equal to 197 grams of water for each gram of SAP particle material. The SAP powder particles having an average PD of 75 microns (spherical particles) absorb greater than or equal to 185 grams of water for each gram of SAP particle material. The GR-111 SAP powder non-spherical particles having an average PD of 75 microns (range of 22-148 microns) absorb 166 grams of water for each gram of SAP particle material. This absorption amount is significantly higher than the larger SAP particle sizes shown in Table 6.

TABLE 6

| SAP Particle Size/Shape (microns) | Water Absorbency (g of $H_2O$/g of SAP) |
| --- | --- |
| 75—non-spherical (GR111) | 166 |
| 75—spherical | ≥185 |
| 63—spherical | ≥197 |
| 25—spherical | ≥220 |

Further, Applicant has tested yield strength of the gel formed from different sized SAP particles following water absorption. The samples were run on a parallel plate Dynamic Mechanical Analyzer at 20° C. using 25 mm serrated parallel plates. A dynamic strain sweep from 0.01 to 100% strain at an angular frequency of 10 Rad/sec. was utilized. The storage modulus and stress were monitored. A plot of storage modulus vs. stress was run. Yield stress analysis was determined from the data. High yield strength is indicative of high water absorption. As shown in Table 7 below, the small sized SAP discussed herein have significantly higher yield strength, further demonstrating improved water absorption as compared to the larger SAP particles standard in conventional buffer tube designs.

TABLE 7

| SAP Particle Size/Shape (microns) | Yield Stress (PA) |
| --- | --- |
| 75—non-spherical (GR111) | 4-7 |
| 75—spherical | Not tested |
| 63—spherical | 37 |
| 25—spherical | 44 |

Rollable Ribbon Designs

Referring generally to FIGS. 19-35, various ribbon embodiments are disclosed that are configured to allow the ribbon to be bent, curved or rolled from an unrolled position to a rolled or curved position. In such embodiments, optical fibers are coupled to and supported by a ribbon body. The ribbon body is formed from a material that is configured to allow the ribbon to be rolled and unrolled multiple times as may be needed in various applications. In various embodiments, the ribbon embodiments discussed herein may utilize a ribbon matrix that completely or partially surrounds the optical fibers when viewed in longitudinal cross-section such that multiple optical fibers are held together in the ribbon structure. Generally, the ribbon body is formed from a material, such as a polymer material, that has an elasticity and/or thickness that allows for the rollability of the ribbon. In some embodiments, the ribbon body may be formed from a plurality of discreet sections or bridges spaced along the longitudinal axis of adjacent optical fibers. In other various embodiments, the ribbon body is contiguous both lengthwise and widthwise over the optical fibers.

Figure 19:
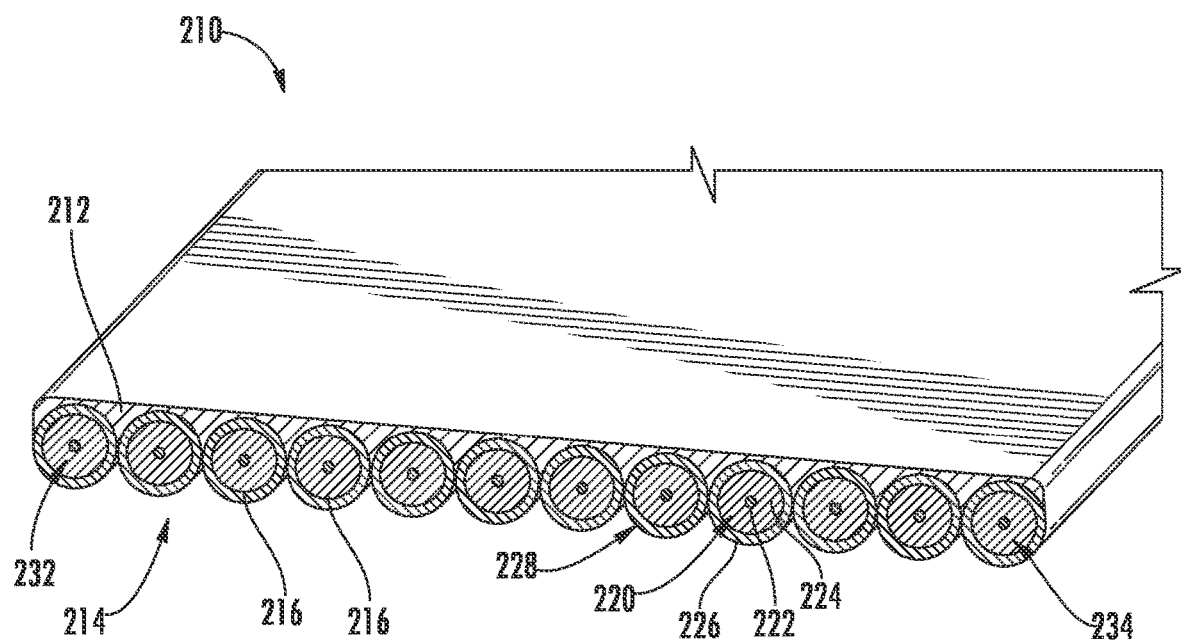
FIG. 19 shows a perspective view of a rollable optical fiber ribbon according to an exemplary embodiment.

Referring to FIG. 19, a rollable optical ribbon, such as optical fiber ribbon 210, is shown according to an exemplary embodiment. Ribbon 210 includes a ribbon body, shown as ribbon matrix 212, and also includes an array 214 of a plurality of optical transmission elements, shown as optical fibers 216. As noted above, optical fibers 216 may be any of the specific optical fiber embodiments discussed herein. Optical fibers 216 are coupled to and supported by the material of ribbon matrix 212. In the embodiment shown, ribbon 210 is shown in an unrolled or aligned position, and in this position, array 214 is a parallel array of optical fibers in which the central axes 218 of each fiber (i.e., the axis of each optical fiber 216 perpendicular to the cross-section shown in FIG. 20) are substantially parallel to each other. In other embodiments, the optical fibers may be arranged in non-parallel arrays within ribbon body 212 (e.g., two by two arrays, staggered arrays, etc.).

In the embodiment shown, ribbon 210 includes a single linear array 214 of optical fibers 216. In some other embodiments, ribbon 210 includes multiple arrays 214 of optical fibers 216. In some embodiments, ribbon 210 includes at least two linear arrays 214. In some other embodiments, ribbon 210 includes at least four linear arrays 214. In still other embodiments, ribbon 210 includes of at least eight linear arrays 214. In yet still other embodiments, ribbon 210 includes of at least 16 linear arrays 214. In some embodiments, each linear array 214 of ribbon 210 has at least two optical fibers 216. In some other embodiments, each linear array 214 of ribbon 210 has at least four optical fibers 216. In still other embodiments, each linear array 214 of ribbon 210 has at least 8 optical fibers 216. In yet still other embodiments, each linear array 214 of ribbon 210 has at least 12 optical fibers 216.

In the embodiment shown, each optical fiber 216 includes a central portion 220 that includes an optically transmitting optical core 222 and a cladding layer 224. Optical fibers 216 also each include a coating layer 226. Details of the core, cladding and coating of optical fibers providing the high levels of bend insensitivity are discussed above.

Coating layer 226 surrounds both optical core 222 and cladding layer 224. In particular, coating layer 226 has an inner surface that contacts and is bonded to the outer surface of cladding layer 224. Coating layer 226 also has an outer surface 228 that defines the outer or exterior surface of each optical fiber 216. In the embodiment shown, coating layer 226 is a single layer formed from a single material that provides protection (e.g., protection from scratches, chips, etc.) to optical fibers 216. In various embodiments, coating layer 226 may be a UV curable acrylate material, and may have a thickness between 10 μm and 100 μm. In the embodiment shown, an inner surface of ribbon matrix 212 is bonded, adhered or coupled to outer surface 228 of each optical fiber 216.

Figure 20:
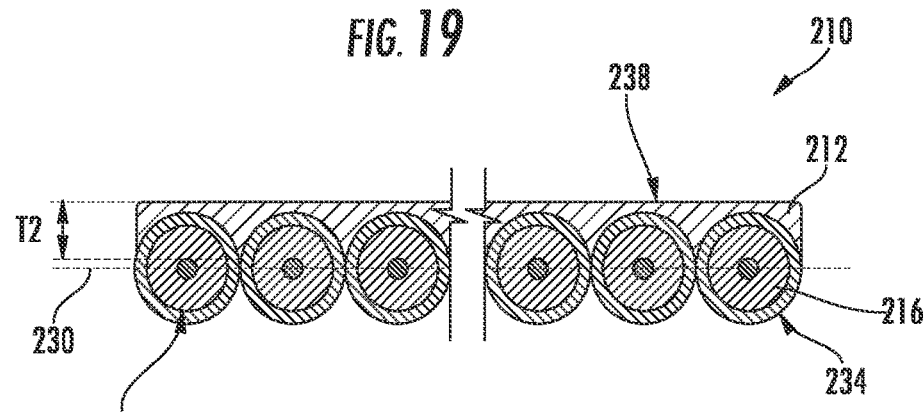
FIG. 20 shows a cross-sectional view of the optical fiber ribbon of FIG. 19 in an unrolled or aligned position according to an exemplary embodiment.
Figure 21:
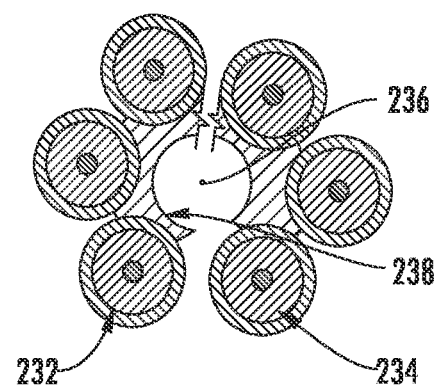
FIG. 21 shows a cross-sectional view of the optical fiber ribbon of FIG. 19 in a rolled or curved position according to an exemplary embodiment.

Ribbon matrix 212 is configured in various ways to allow ribbon 210 to be reversibly moved from an unrolled or aligned position (shown in FIGS. 19 and 20) to a curved or rolled position shown in FIG. 21, while still providing sufficient support and structure for fibers 216. It should be understood that FIGS. 20 and 21 only show the end portions of ribbon 210 for convenience, as represented by the break lines shown in FIGS. 20 and 21.

In the unrolled or aligned position, shown in FIGS. 19 and 20, optical fibers 216 of the linear array 214 are substantially aligned with each other such that the central axes of the optical fiber 216 are parallel to each other and lie along the same central fiber plane 230. As used herein, substantial alignment between optical fibers 216 allows for some deviation between the central axes of the optical fibers and central fiber plane 230, such that the central axis of each substantially aligned fiber is spaced less than 45 μm, in some embodiments less than 20 μm, in other embodiments ≤10 μm, and in other embodiments ≤5 μm, from central fiber plane 230 and/or the maximum vertical distance (in the orientation of FIGS. 19 and 20) between the center points of any of the fibers 216 is 90 μm or less. Further, in the unrolled or aligned position, the horizontal distance (in the orientation of FIGS. 19 and 20) between the optical fibers 216 at opposing ends of array 214, shown as first end fiber 232 and second end fiber 234, is at a maximum permitted by the ribbon matrix structure.

To move from the unrolled position of FIG. 20 to the rolled position shown in FIG. 21, ribbon matrix 212 is bent or curved around ribbon longitudinal axis 236. Thus, in the curved position, fibers 216 define an arc or curve around longitudinal axis 236, and the horizontal distance between first end fiber 232 and second end fiber 234 is decreased. In this arrangement, when rolled ribbon 210 is held straight the central axes of optical fibers 216 are substantially parallel to longitudinal axis 236. In the embodiment shown in FIG. 21, ribbon 210 in the curved position assumes a substantially circular arrangement such that first end fiber 232 is brought into close proximity or into contact with second end fiber 234. In the embodiment shown, ribbon matrix 212 is configured such that when ribbon 210 is rolled, ribbon matrix 212 is located on the inside of the rolled ribbon such that a surface 238 of ribbon matrix 212 opposite of optical fibers 216 faces longitudinal axis 236. In specific embodiments, the rollable ribbons discussed herein may be in a rolled configuration within the cable, and an end of the ribbon may be returned to the unrolled position to be coupled to an optical connector, such as via use of mass splicing equipment.

In various specific embodiments, the structure and/or material properties of ribbon matrix 212 discussed herein provides for an improved ribbon that balances rollability with fiber support. In various embodiments, ribbon matrix 212 only partially surrounds optical fibers 216. In contrast to non-rollable conventional optical ribbons in which the ribbon matrix completely surrounds the optical fibers, it is believed the rollability of ribbon 210 is enhanced by providing a ribbon matrix 212 that partially surrounds optical fibers 216. In this arrangement, the partial surrounding of optical fibers 216 provided by ribbon matrix 212 results in a ribbon 210 in which the outermost surface of ribbon 210 on one side of the ribbon (e.g., the upper side in the orientation of FIG. 20) is defined by surface 238 of ribbon matrix 212, and the outermost surface of ribbon 210 on the opposite side of the ribbon (e.g., the lower side in the orientation of FIG. 20) is defined by outer surface 228 of optical fibers 216.

Further, in this arrangement, ribbon matrix 212 is substantially located only on one side of ribbon 210. For example, as shown in FIG. 20, at least 90% of the material of ribbon matrix 212 is located on one side (e.g., above) of central fiber plane 230. In a specific embodiment, all or substantially all (e.g., greater than 99%) of ribbon matrix 212 is located on one side of central fiber plane 230. In such embodiments, without ribbon matrix 212 extending downward between adjacent optical fibers 216, optical fibers 216 are allowed to abut each other such that outer surface 228 of each optical fiber 216 contacts the outer surface 228 of at least one other optical fiber 216. As shown in FIG. 20, each of the interior optical fibers 216 abuts two adjacent optical fibers 216.

Further, as shown in FIG. 19, ribbon matrix 212 is a substantially contiguous ribbon matrix. In the embodiment shown, ribbon matrix 212 is contiguous (e.g., an unbroken, integral unitary body with no gaps or holes) in the lengthwise direction for at least 10 cm, specifically for at least 50 cm and more specifically for at least 1 m. In a specific embodiment, ribbon matrix 212 is contiguous (e.g., an unbroken, integral unitary body with no gaps or holes) in the lengthwise direction for the entire length of the ribbon. In addition, ribbon matrix 212 is contiguous in the widthwise direction such that ribbon matrix 212 extends over at least two of the optical fibers 216. In the specific embodiment shown, ribbon matrix 212 is contiguous in the widthwise direction such that ribbon matrix 212 extends over all of the optical fibers 216 of ribbon 210. Applicant believes that this arrangement provides suitable support and protection to optical fibers 216 while also providing a rollable ribbon 210.

Ribbon matrix 212 also has a thickness that provides a balance between suitable support and protection to optical fibers 216 and the rollability of ribbon 210. As shown in FIG. 20, ribbon matrix 212 has a maximum thickness shown as T2. In various embodiments, T2 is between 5 µm and 150 µm. In other embodiments, T2 is ≤125 µm, is ≤100 µm, is ≤50 µm, is ≤25 µm, and ≤10 µm. In some embodiments, T2 and the ranges discussed herein relate to an average thickness of ribbon matrix 212.

Ribbon matrix 212 is also formed from a material, e.g., a polymer material, such as a thermoplastic material or a curable polymer material, having a modulus of elasticity that provides a balance between suitable support and protection to optical fibers 216 and the rollability of ribbon 210. In various embodiments, the modulus of elasticity of the material of ribbon matrix 212 is ≤1500 MPa. In some embodiments, the modulus of elasticity of the material of ribbon matrix 212 is greater than 1 MPa and ≤1500 MPa, specifically greater than 10 MPa and ≤1500 MPa, and in some embodiments is greater than 85 MPa and ≤1500 MPa.

In some embodiments, ribbon matrix 212 is formed from a single layer of polymer material having a modulus of elasticity greater than 10 MPa and less than 100 MPa. In other embodiments, ribbon matrix 212 is comprised of two layers, an inner layer and an outer layer. In some embodiments, the inner layer is in contact with optical fibers 216 and the outer layer defines the outer surface of the ribbon. In specific embodiments, the inner layer has a modulus of elasticity ≤1.5 MPa, and the outer layer has a modulus of elasticity greater than 1000 MPa. In specific embodiments, the total thickness of the two layer ribbon matrix 212 is ≤40 microns, and in other embodiments, is ≤30 microns, or is ≤20 microns in still other embodiments.

In various embodiments, ribbon matrix 212 and optical fibers 216 may be configured to facilitate identification and connectorization of ribbon 210. In such embodiments, ribbon matrix 212 and/or optical fibers 216 may include coloring or printed indicia to identify the type, location, etc., of optical fibers 216 within ribbon 210.

Figure 22:
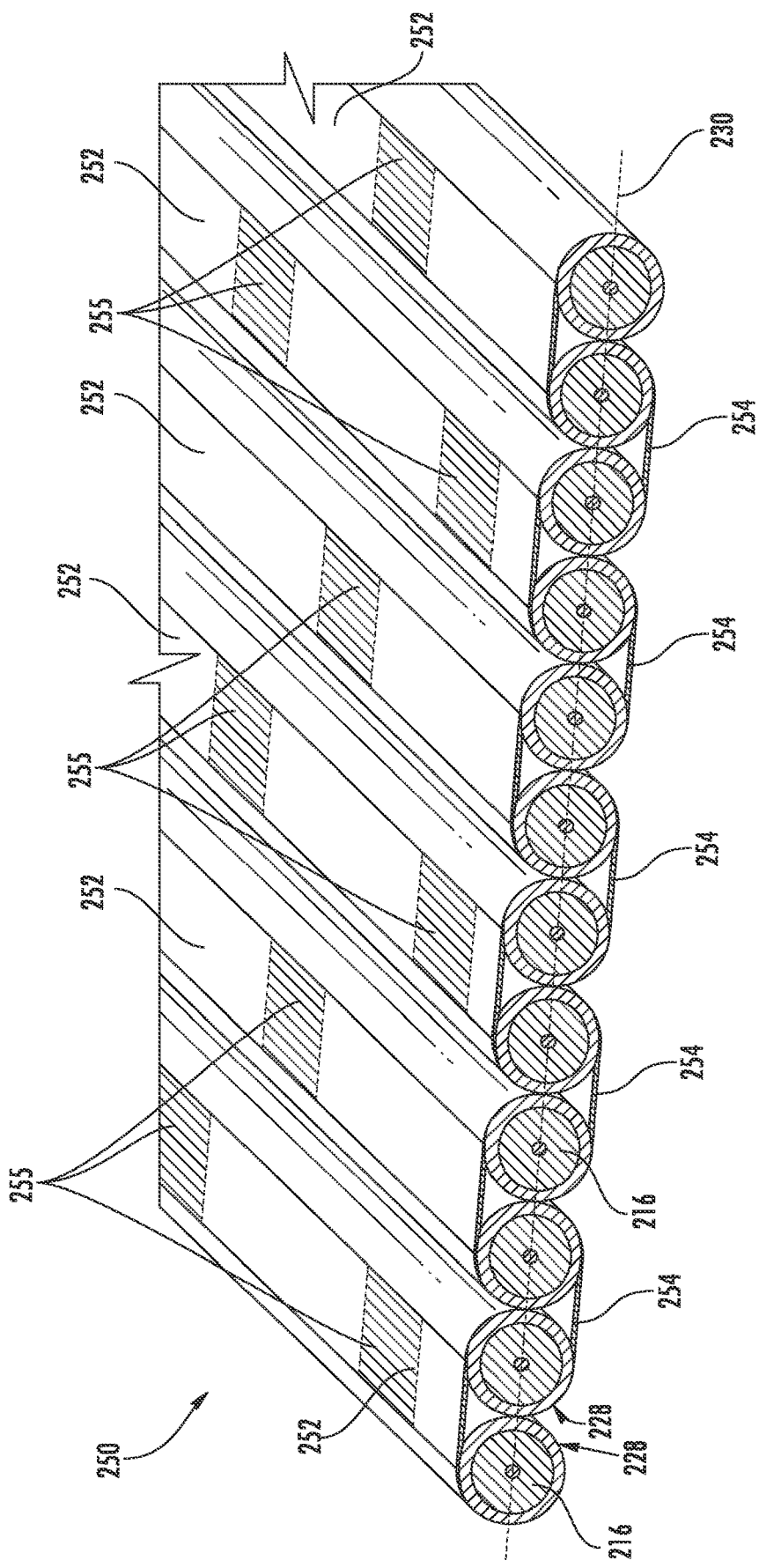
FIG. 22 shows a perspective view of a rollable optical fiber ribbon according to another exemplary embodiment.

Referring to FIG. 22, another optical ribbon, shown as rollable optical fiber ribbon 250, is shown according to an exemplary embodiment. Ribbon 250 is substantially similar to ribbon 210 except as discussed herein. Ribbon 250 includes a ribbon body including a plurality of alternating ribbon bridges, shown as upper webs 252 and lower webs 254. In general, webs 252 and 254 are bands of polymer material that are coupled between outer surfaces 228 of adjacent optical fibers 216. In one embodiment, webs 252 and 254 are contiguous in the lengthwise direction and each extends over at least two optical fibers 216. In another embodiments, webs 252 and 254 may be formed from a series of discreet webs separated from each other in the lengthwise direction by gaps 255, shown via broken lines in FIG. 22. Whether continuous lengthwise or separated by gaps 255, webs 252 and 254 are spaced from central fiber plane 230 such that outermost, planar surfaces of webs 252 and 254 are substantially parallel to fiber plane 230 and are positioned tangentially to the outer surface 228 of adjacent fiber pairs.

In the embodiment shown, each web 252 and 254 extends over and is coupled to two optical fibers 216. Webs 252 and 254 are positioned on alternating sides of ribbon 210 such that in the horizontal direction one web 254 is located between adjacent pairs of webs 252. Further, webs 252 and 254 alternately define the uppermost and lowermost surfaces of ribbon 250 at the positions of webs 252 and 254. In this embodiment, webs 252 and 254 are relatively thin having a thickness between 5 microns and 150 microns. Further, it is believed that the alternating positioning of webs 252 and 254 allows ribbon 250 to be rolled in either direction, and by offsetting webs 252 and 254 from central fiber plane 230, bending strain on the ribbon material may be reduced.

Figure 23:
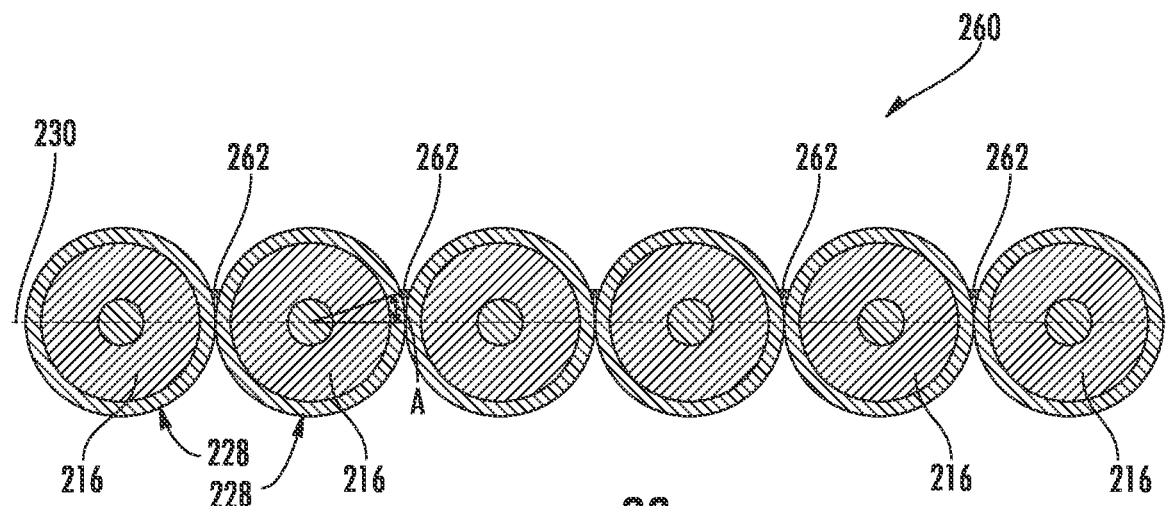
FIG. 23 shows a cross-sectional view of a rollable optical fiber ribbon according to another exemplary embodiment.

Referring to FIG. 23, another optical ribbon, shown as rollable optical fiber ribbon 260, is shown according to an exemplary embodiment. Ribbon 260 is substantially similar to ribbon 210, except as discussed herein. Ribbon 260 includes a ribbon body including a plurality of ribbon bridges, shown as webs 262. In general, webs 262 are bands of polymer material that are coupled between outer surfaces 228 of adjacent optical fibers 216. In some embodiments, webs 262 are contiguous in the lengthwise direction and each extends between the outer surfaces of two adjacent optical fibers 216. In other embodiments, webs 262 are discreet bridges separated from each other in the lengthwise direction by gaps without web material and each extends between the outer surfaces of two adjacent optical fibers 216. Webs 262 are spaced from central fiber plane 230 such that outermost, planar surfaces of webs 262 are substantially parallel to fiber plane 230, and webs 262 are located below the outermost portion of surface 228. In various embodiments, the angular positioning of webs 262 relative to the central fiber plan 230 is shown by angle A. In various embodiments, angle A is greater than 0 degrees and less than 90 degrees, specifically is between 5 degrees and 45 degrees, and more specifically is between 10 degrees and 20 degrees. In a specific embodiment, angle A is about 15 degrees (e.g., 15 degrees plus or minus 1 degree). In various embodiments, webs 262 have a thickness between 5 microns and 75 microns.

Figure 24:
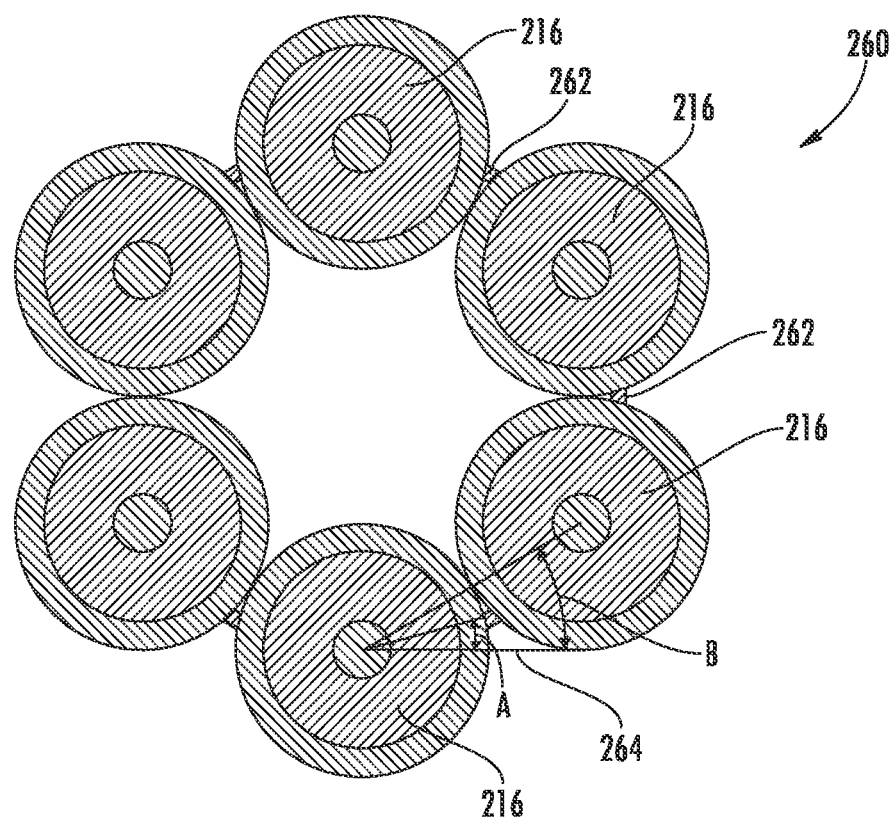
FIG. 24 shows a cross-sectional view of the rollable optical fiber ribbon of FIG. 23 in a rolled or curved position according to an exemplary embodiment.

Referring to FIG. 24, ribbon 260 is shown in the rolled or curved position according to an exemplary embodiment. In this embodiment, ribbon 260 is rolled such that webs 262 face outward from rolled ribbon 260. Further, ribbon 260 is rolled defining an angle B between center points of two adjacent optical fibers 216, as measured from a horizontal plane 264. In general angle B represents the degree of bend allowed by webs 262. In various embodiments, angle B is between 10 degrees and 90 degrees, specifically is between 15 degrees and 45 degrees and more specifically is about 30 degrees (e.g., 30 degrees plus or minus 1 degree). In an embodiment in which ribbon 260 includes 6 optical fibers 216, webs 262 allow ribbon 260 to be rolled into a hexagonal array as shown in FIG. 24.

Figure 25:
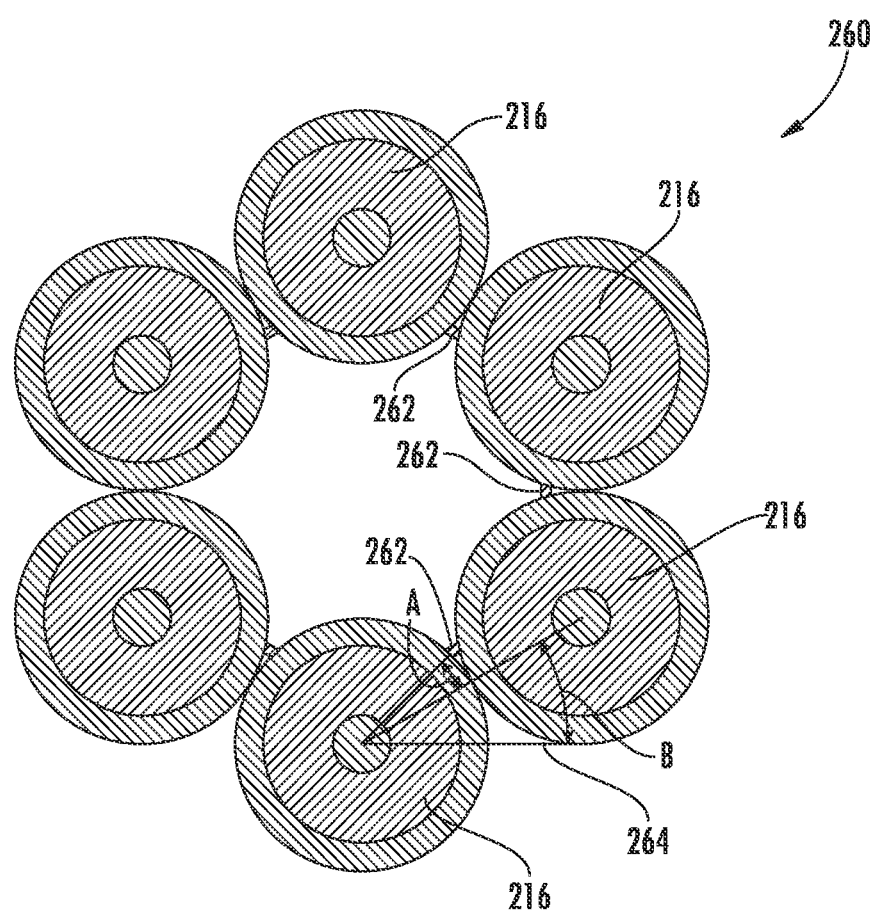
FIG. 25 shows a cross-sectional view of the rollable optical fiber ribbon of FIG. 23 in another rolled or curved position according to an exemplary embodiment.

Referring to FIG. 25, ribbon 260 is shown in the rolled or curved position according to another exemplary embodiment. In this embodiment, ribbon 260 is rolled such that webs 262 face inward toward the longitudinal axis of rolled ribbon 260. In various embodiments, webs 262 may be formed from material having elasticity that allows ribbon 260 to be rolled in both the configuration shown in FIG. 24 and in FIG. 25.

Figure 26:
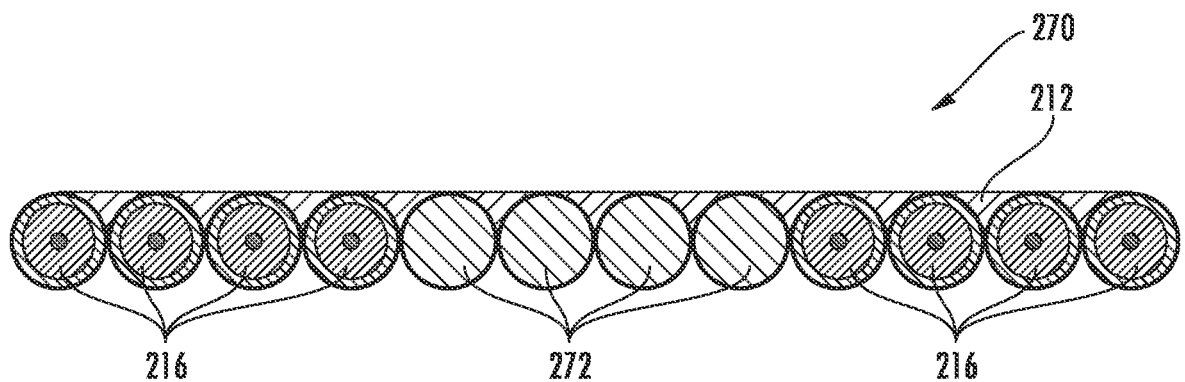
FIG. 26 shows a cross-sectional view of a rollable optical fiber ribbon according to another exemplary embodiment.

Referring to FIG. 26, another optical ribbon, shown as rollable optical fiber ribbon 270, is shown according to an exemplary embodiment. Ribbon 270 is substantially similar to ribbon 210 except as discussed herein. Ribbon 270 includes eight optical fibers 216 supported by ribbon matrix 212. Ribbon 270 includes a plurality of strength elements, shown as aramid yarn strands 272, supported from ribbon matrix 212. In the embodiment shown, aramid yarn strands 272 are located in the center of ribbon 270 such that two end groups of optical fibers 216 are formed. In other embodiments, aramid yarn strands 272 may be positioned at any other positions within ribbon matrix 212. Further, in other embodiments, ribbon 270 may include other strength elements, such as steel wire, glass reinforced plastics, other strength yarn types, etc., in place of aramid yarn strands 272.

Figure 27:
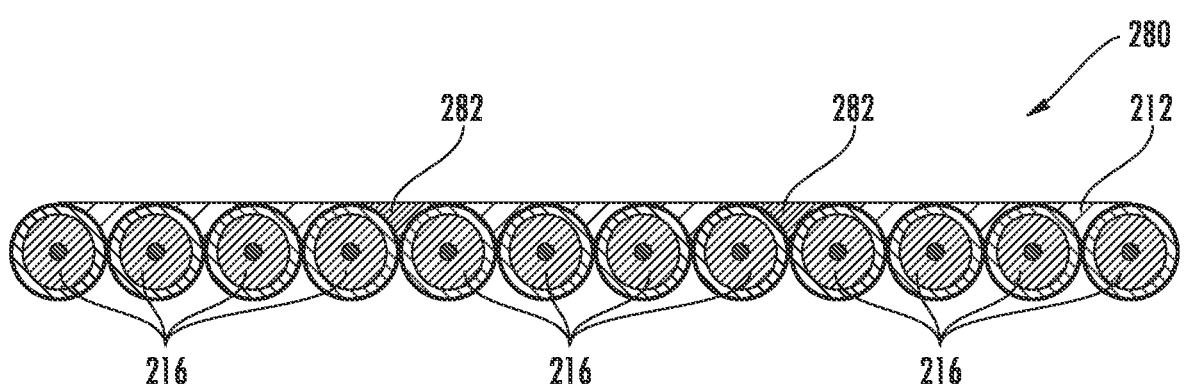
FIG. 27 shows a cross-sectional view of a rollable optical fiber ribbon according to another exemplary embodiment.

Referring to FIG. 27, another optical ribbon, shown as rollable optical fiber ribbon 280, is shown according to an exemplary embodiment. Ribbon 280 is substantially similar to ribbon 210 except as discussed herein. Ribbon 280 includes one or more regions, shown as regions 282, within ribbon matrix 212 that is formed from a different material than the rest of ribbon matrix 212. In some such embodiments, regions 282 are formed from a polymer material having a lower modulus of elasticity than the rest of ribbon matrix 212. Further, regions 282 may be formed from a material that has low bonding with the material forming the rest of ribbon matrix 212, and in yet other embodiments, regions 282 may be thinner than adjacent regions of ribbon matrix 212. In such embodiments, regions 282 act as separation points allowing groups of optical fibers 216 to be separated from each other. In specific embodiments, regions 282 are formed from a polymer material having a modulus of elasticity lower than that of the material forming the rest of ribbon matrix 212, and the modulus of elasticity of the material of regions 282 is between 0.5 and 1000 MPa. In other embodiments, ribbon 280 may include other tear features, ripcords, scores, etc. in place of or in addition to regions 282. In specific embodiments, regions 282 may be colored differently from the rest of ribbon matrix 212 or include printed indicia that provides an indication of the location of regions 282. In some embodiments, regions 282 may extend the entire length of ribbon 280, and in other embodiments, regions 282 may only be located at certain portions along the length of ribbon 280 providing differing accessibility to optical fibers 216, along the length of ribbon 280.

Figure 28:
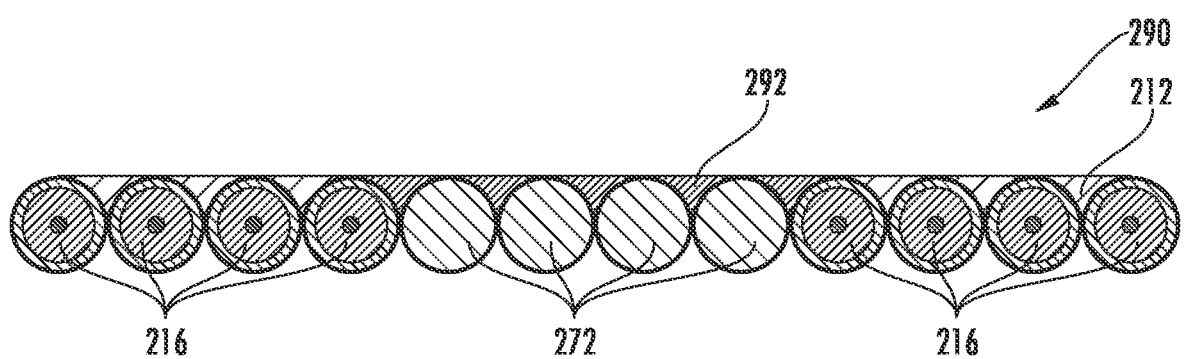
FIG. 28 shows a cross-sectional view of a rollable optical fiber ribbon according to another exemplary embodiment.

Referring to FIG. 28, another optical ribbon, shown as rollable optical fiber ribbon 290, is shown according to an exemplary embodiment. Ribbon 290 is substantially similar to ribbon 270 except as discussed herein. In this embodiment, ribbon matrix 212 of ribbon 290 includes a region 292 in which aramid yarn strands 272 are supported. In such embodiments, region 292 may be similar to regions 282 in that region 292 has a lower modulus of elasticity than the rest of ribbon matrix 212, which facilitates separation of aramid yarn strands 272 from optical fibers 216. Such separation of aramid yarn strands 272 may be desirable during some connectorization procedures.

Figure 29:
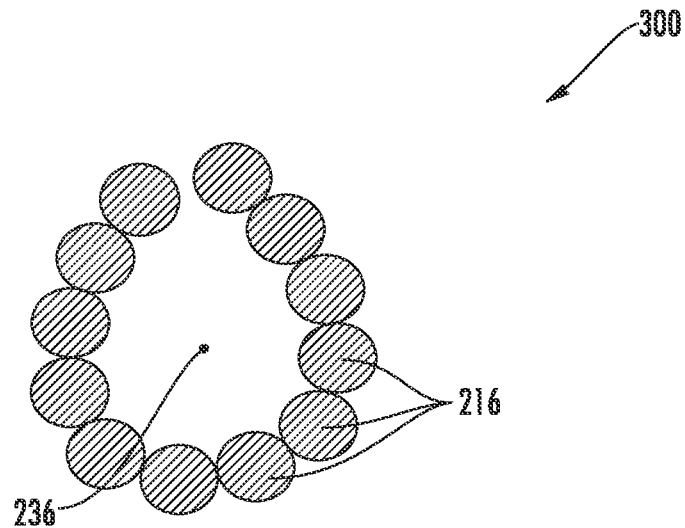
FIG. 29 shows a cross-sectional view of a rollable optical fiber ribbon in a rolled or curved position according to another exemplary embodiment.
Figure 30:
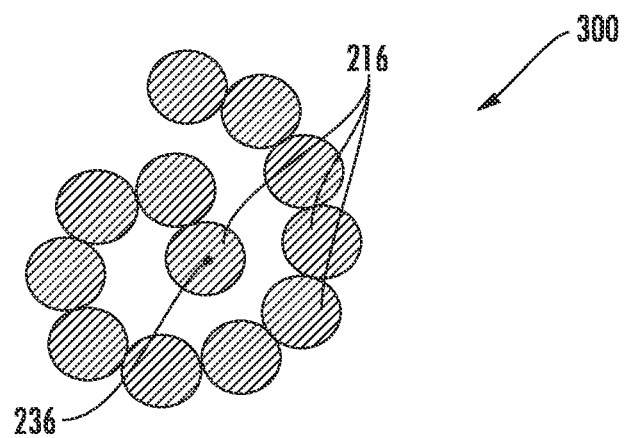
FIG. 30 shows a cross-sectional view of a rollable optical fiber ribbon in a rolled or curved position according to another exemplary embodiment.

FIGS. 29 and 30 show an optical fiber ribbon 300 in various curved or rolled configurations. It should be understood that optical fiber ribbon 300 may be any of the optical fiber ribbon embodiments discussed herein. As shown in FIG. 29, optical fiber ribbon 300 may be rolled into a non-circular curved shape in which optical fibers 216 surround longitudinal ribbon axis 236. As shown in FIG. 30, optical fiber ribbon 300 may be rolled into a spiral shape in which most of the optical fibers 216 surround longitudinal ribbon axis 236 and the innermost end optical fiber 216, resides at or near longitudinal ribbon axis 236. In some embodiments, the rolled arrangements shown in FIGS. 29 and 30, may allow ribbon 300 to be stranded or otherwise located within a cable without first being located within a buffer tube. In such embodiments, the rolled structure of the ribbon provides an organization and appearance similar to that of a loose tube cable in which fibers are located within buffer tubes.

In various embodiments, when an optical fiber ribbon containing glass optical fibers, such as ribbon 300, is rolled or folded into a non-planar array, the minimum bending stiffness tends to increase significantly because there will no longer exist a bend axis that allows all of the glass fibers to occupy the neutral axis. As a result, not only will the rolled ribbon be stiffer than a planar ribbon, but also the material of the ribbon body may also be subject to significant shear stress in order to maintain the rolled ribbon as a coherent composite structure. In some embodiments, the material of the ribbon bodies discussed herein have sufficient strength and elasticity to resist the forces associated with stranding of the rolled ribbon 300 into a cable and also those forces associated with the bending of the cable as it is stored, installed and put in use. In other embodiments, the ribbon bodies discussed herein are designed to intentionally separate at more moderate stress levels, relieving stress as needed while remaining intact at sufficient intervals along the length to provide the intended fiber organization benefit.

Figure 31:
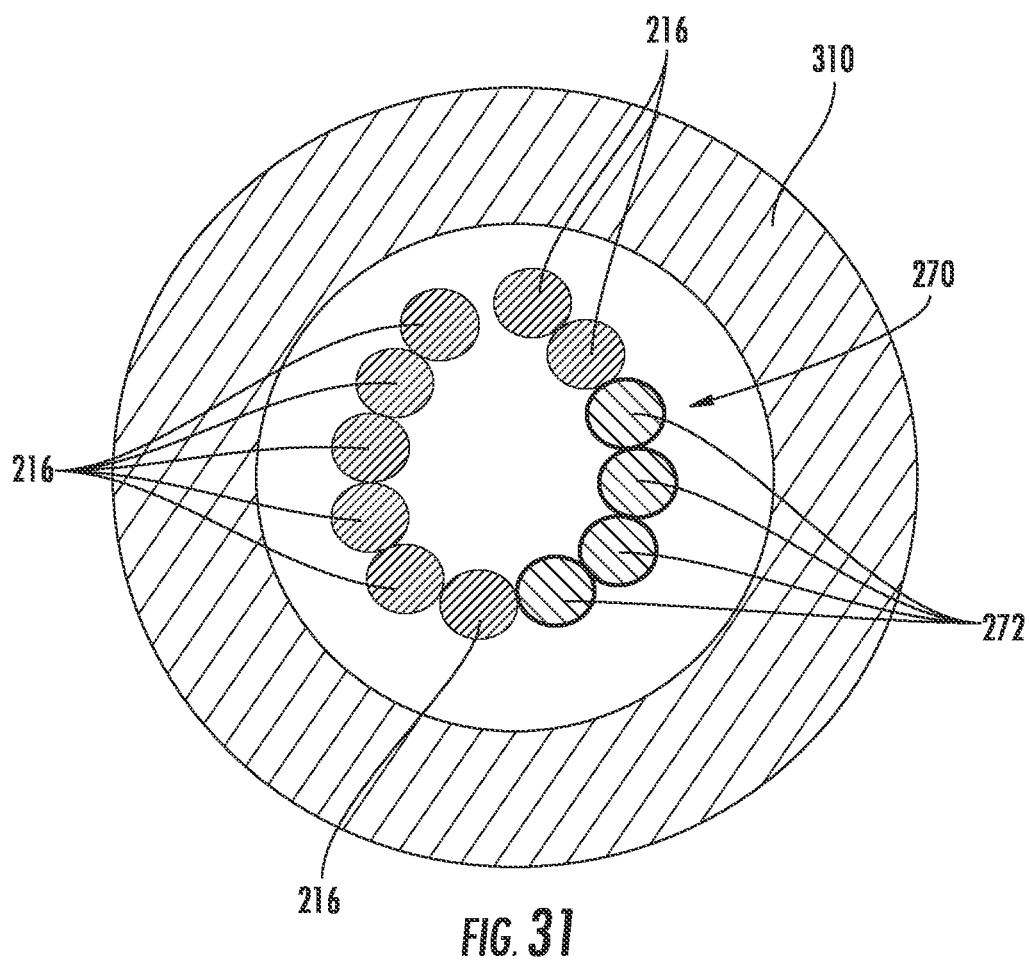
FIG. 31 shows a cross-sectional view of a rollable optical fiber ribbon in a rolled or curved position located within a buffer tube according to another exemplary embodiment.
Figure 32:
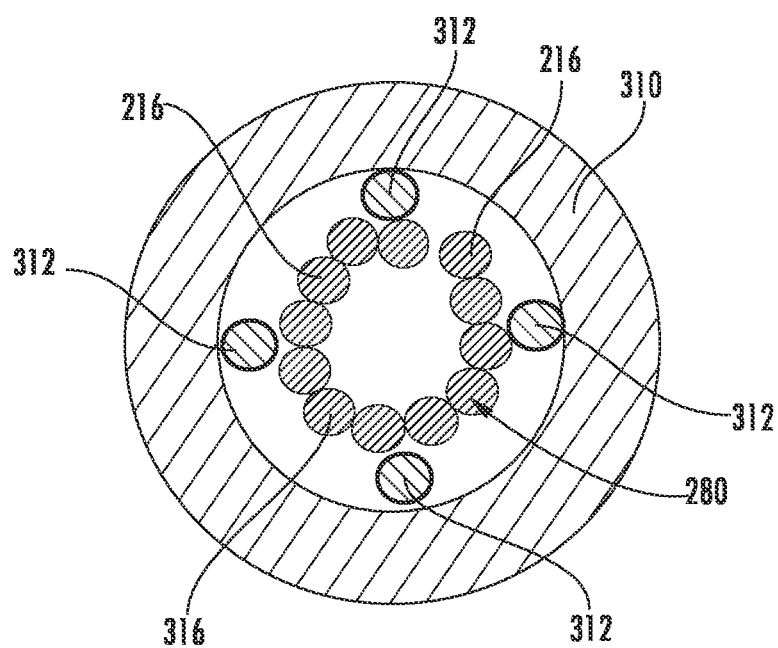
FIG. 32 shows a cross-sectional view of a rollable optical fiber ribbon in a rolled or curved position located within a buffer tube according to another exemplary embodiment.

Referring to FIGS. 31 and 32, the various ribbon embodiments discussed herein may be located within a polymeric buffer tube 310, which in turn may be incorporated into a fiber optic cable. As shown in FIG. 31, optical fiber ribbon 270, which includes embedded aramid yarn strands 272, may be rolled and located within buffer tube 310 without additional loose strength elements. In another embodiment, as shown in FIG. 32, an optical fiber ribbon without embedded strength elements, such as optical fiber ribbon 280, may be rolled and located within buffer tube 310, and additional loose strength elements, shown as loose aramid yarn strands 312, may be included within buffer tube 310. In other embodiments, the rollable optical fiber ribbons discussed herein may be used within cables without buffer tubes surrounding the ribbons. In such embodiments, the rolled optical fiber ribbons may be directly positioned within a cable jacket and may be stranded around a central strength member.

In various embodiments, the ribbon bodies discussed herein may be formed by applying a polymer material, such as a UV curable polymer material, around optical fibers 216 in the desired arrangement to form a particular ribbon body. The polymer material is then cured forming the integral, contiguous ribbon body while also coupling the ribbon body to the optical fibers. In other embodiments, the ribbon bodies discussed herein may be formed from any suitable polymer material, including thermoplastic materials and thermoset materials.

Figure 33:
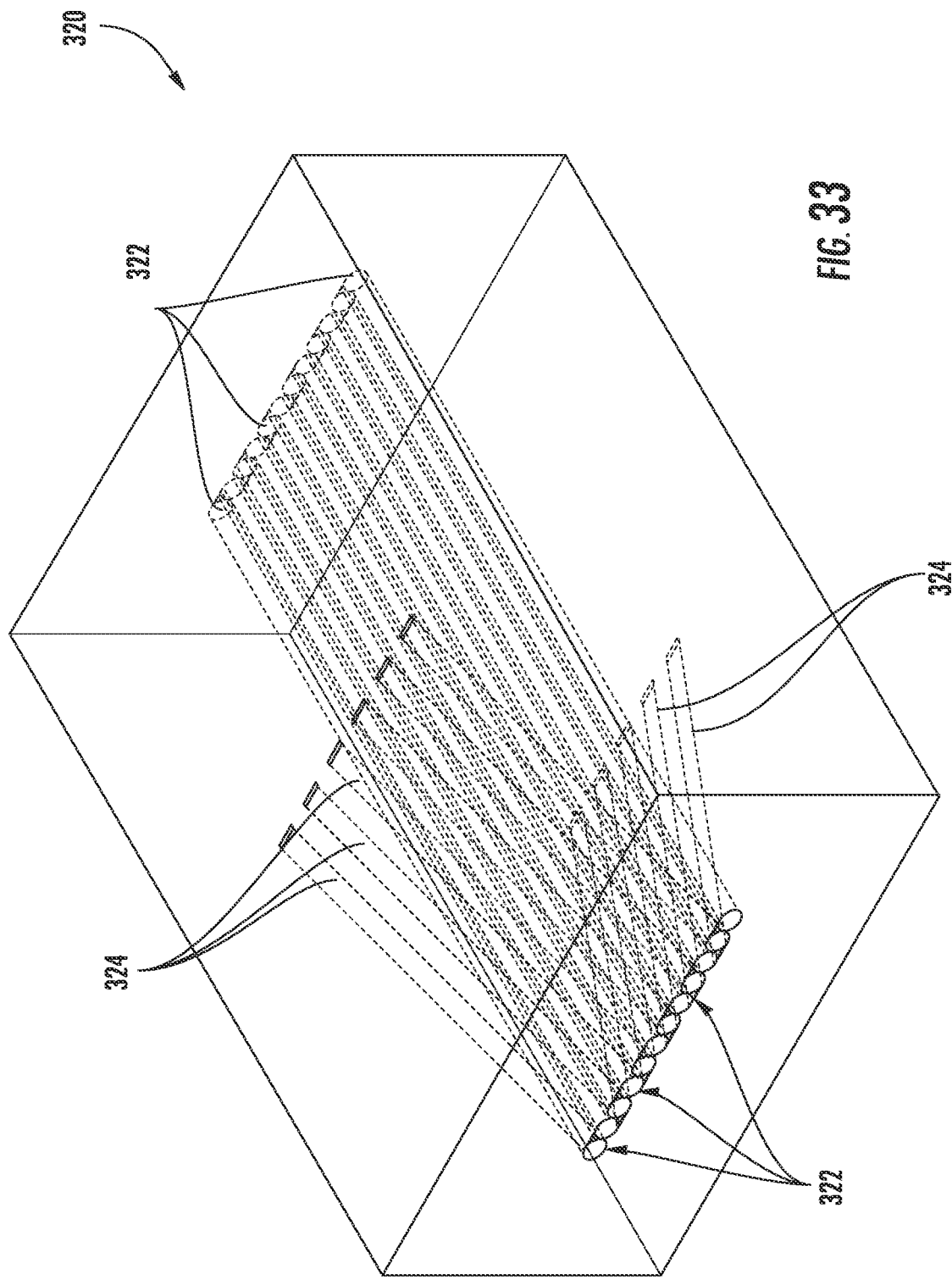
FIG. 33 shows a system configured to form a rollable optical fiber ribbon according to an exemplary embodiment.

FIG. 33 shows an exemplary tool for forming a ribbon body. Tool 320 consists of a block of abrasion resistant material bored with a series of fiber channels 322 to guide an array of optical fibers 216 that are pulled through tool 320. Resin channels 324 convey liquid resin in a path that intersects fiber channels 322 at the exit of the tool. UV curable liquid resin as an example could be applied using the tool and immediately cured by the use of UV lamps positioned at the tool exit to form the polymer ribbon bodies discussed herein. In various embodiments, the shape of the interface between fiber channels 322 and resin channels 324 may be configured to form any of the ribbon body shapes discussed herein. Further, to form ribbons (such as ribbons 210, 260, 270, 280 and 290) in which the ribbon body is only on one side of optical fibers 216, tool 320 would be operated to supply resin only through either the upper series or through the lower series of resin channels 324. To form a ribbon, such as ribbon 250 having ribbon body portions on both sides of the ribbon resin would be supplied through both the upper series and through the lower series of resin channels 324.

Figure 34:
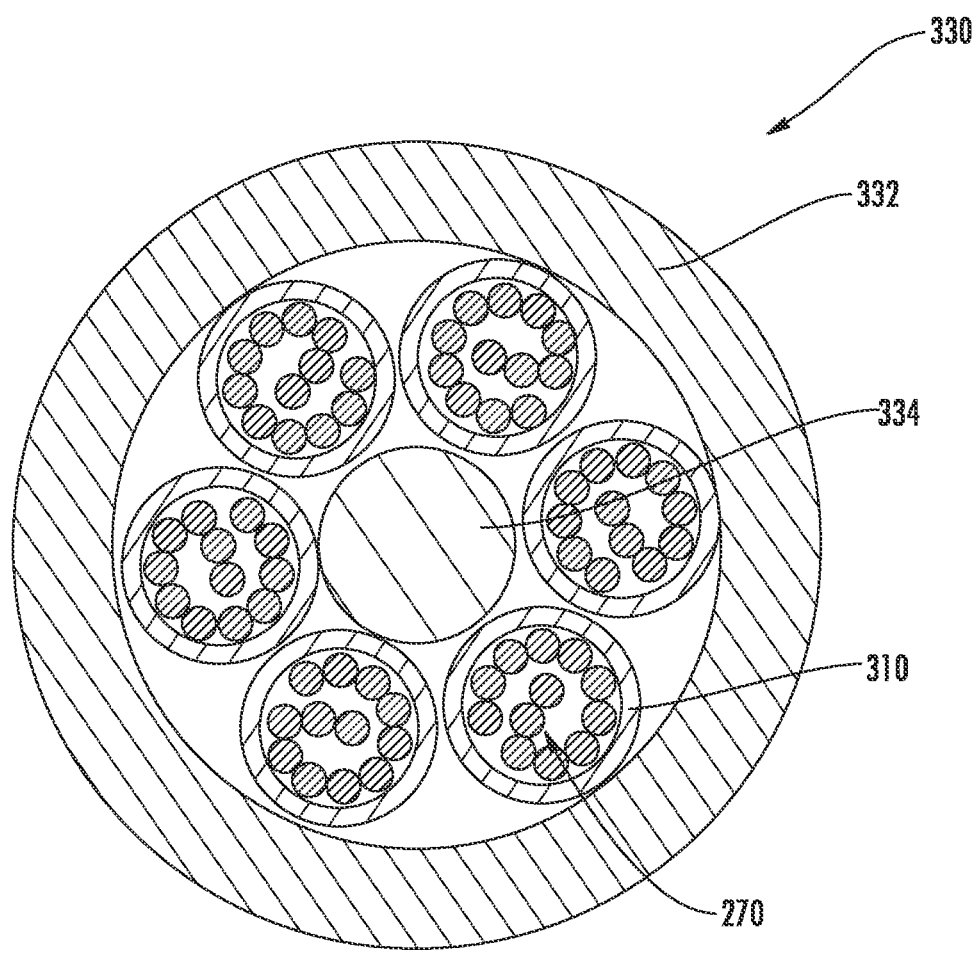
FIG. 34 is a cross-sectional view of cable including rollable optical fiber ribbons according to an exemplary embodiment.

Referring to FIG. 34, in various embodiments, any of the ribbons discussed herein may be incorporated into a cable, such as cable 330. Cable 330 includes a polymeric cable jacket 332 and a elongate strength member 334 (e.g., a GRP rod, metal wire, etc.) located within cable jacket 332. A plurality of optical fiber ribbon containing buffer tubes 310 surround strength member 334, and each buffer tube 310 includes an optical fiber ribbon, such as ribbon 270 discussed above. It should be understood however that cable 330 may include any of the ribbon embodiments discussed herein in any combination. In various embodiments, a binding element, such as a helically wound binder yarn or thin film binder, may be located to the outside of buffer tubes 310 and surrounding buffer tubes 310 and may act to hold buffer tubes 310 in a stranded pattern (e.g., an SZ stranding pattern) around strength member 334. In other embodiments, cable 330 includes no binding element.

Figure 35:
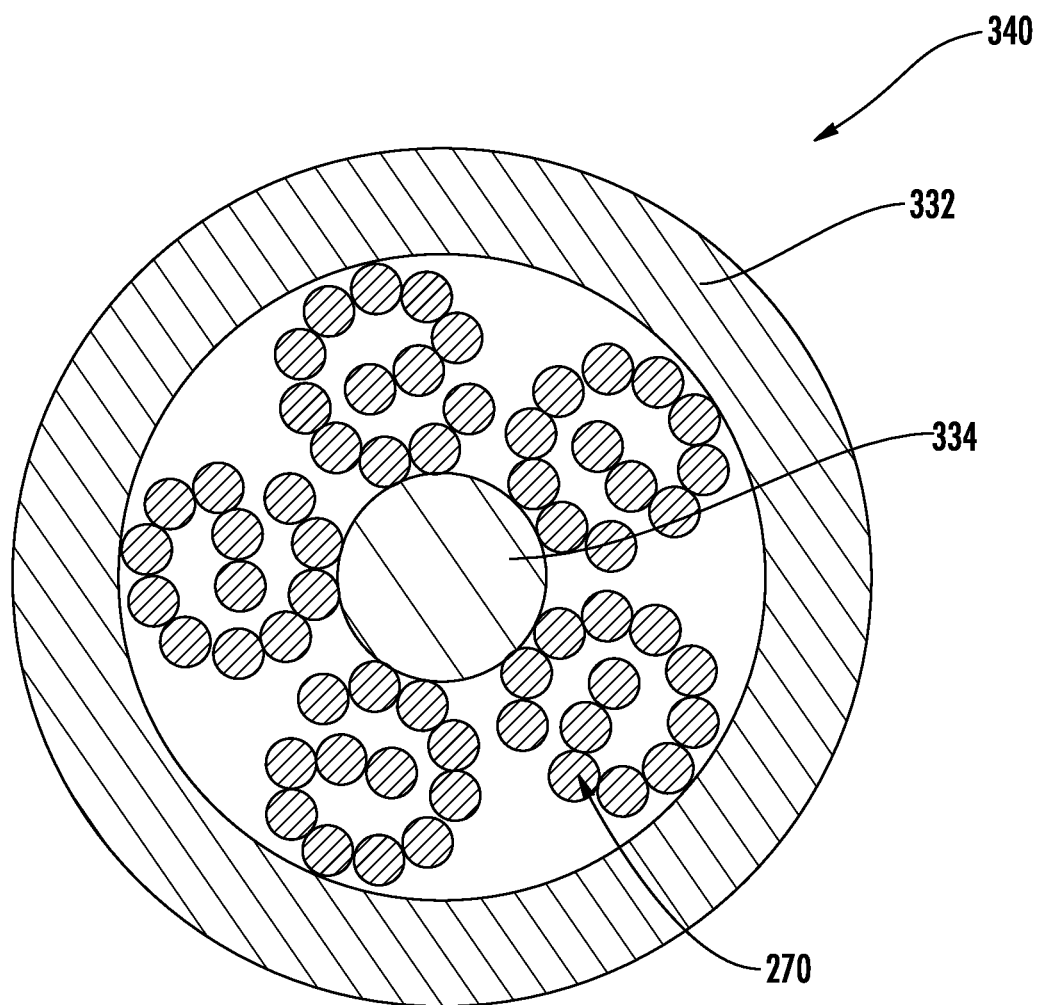
FIG. 35 is a cross-sectional view of cable including rollable optical fiber ribbons located within a cable jacket without buffer tubes according to an exemplary embodiment.

In various embodiments, as shown in FIG. 35, a cable 340 may include rolled ribbons located within the cable without buffer tubes 310. In such embodiments, the ribbons may be rolled and then stranded directly around strength member 334. In some such embodiments, cable 340 may optionally include a binding element surrounding the rolled ribbons, and the binding element acts to bind the rolled ribbons to strength member 334. In various embodiments, each rolled ribbon may be surrounded by a binder element that helps hold the rolled ribbon in the rolled position, and in some such embodiments, the binder element may be color-coded to help identify a particular ribbon within cable 330. In some other embodiments, cable 340 may include one or more strength member (e.g., a GRP rod, metal wire, etc.) embedded within jacket 332 in place of or in addition to strength member 334, and in some such embodiments, the optical fiber ribbons are located within cable 340 without buffer tubes.

It should understood that the optical ribbons discussed herein can include various numbers of optical fibers 216. In various exemplary embodiments, the optical ribbons discussed herein may include 2, 4, 6, 8, 10, 12, 14, 16, 24 etc. optical fibers or transmission elements (e.g., optical fibers 216). While the ribbon embodiments discussed herein are shown having optical fibers 216 arranged in a substantially parallel, linear array, optical fibers 216 may be arranged in a square array, rectangular array, a staggered array, or any other spatial pattern that may be desirable for a particular application.

It is to be understood that the foregoing description is exemplary only and is intended to provide an overview for the understanding of the nature and character of the fibers which are defined by the claims. The accompanying drawings are included to provide a further understanding of the embodiments and are incorporated and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

While the specific cable embodiments discussed herein and shown in the figures relate primarily to cables that have a substantially circular cross-sectional shape defining a substantially cylindrical internal bore, in other embodiments, the cables discussed herein may have any number of cross-section shapes. For example, in various embodiments, cable jacket 12 may have an oval, elliptical, square, rectangular, triangular or other cross-sectional shape. In such embodiments, the passage or lumen of the cable may be the same shape or different shape than the shape of cable jacket 12. In some embodiments, cable jacket 12 may define more than one channel or passage. In such embodiments, the multiple channels may be of the same size and shape as each other or may each have different sizes or shapes.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A rollable optical fiber ribbon comprising:
   a plurality of optical fibers, wherein each optical fiber comprises:
      a core;
      a cladding surrounding and directly adjacent to the core;
      at least one coating surrounding the cladding;
      an outer diameter ≤210 microns as measured at an outer surface of the at least one coating;
      a mode field diameter of ≥9 microns at 1310 nm; and
      a macrobend loss of ≤0.5 dB/turn at 1550 nm for a mandrel diameter of 15 mm; and
   a ribbon body coupled to and supporting the plurality of optical fibers in an array, wherein the ribbon body is formed from a flexible material such that the plurality of optical fibers are reversibly movable from an unrolled position in which the plurality of optical fibers are substantially aligned with each other to a rolled position.

2. The rollable optical fiber ribbon of claim 1, wherein the ribbon body comprises a plurality of discreet bridges located between adjacent pairs of optical fibers, wherein each of the discreet bridges are separated from each other in a longitudinal direction by a gap.

3. The rollable optical fiber ribbon of claim 1, wherein the ribbon body is contiguous lengthwise for at least 10 cm along a length of the plurality of optical fibers and is contiguous widthwise over the plurality of optical fibers.

4. The rollable optical fiber ribbon of claim 1, wherein the ribbon body partially surrounds the plurality of optical fibers such that an outer surface of the ribbon body defines an outermost surface on a first side of the ribbon and polymeric fiber coating the at least one coating of each of the plurality of optical fibers define an outermost surface on a second side of the ribbon opposite the first side of the ribbon.

5. The rollable optical fiber ribbon of claim 1, wherein the flexible material is a polymeric material that has a modulus of elasticity greater than 1 MPa and ≤1500 MPa.

6. The rollable optical fiber ribbon of claim 1, wherein each of the optical fibers further comprises an outer diameter of ≤190 microns.

7. The rollable optical fiber ribbon of claim 1, wherein each of the optical fibers further comprises a wire-mesh covered drum microbending loss at 1550 nm of ≤0.03 dB/km and a cable cutoff of ≤1260 nm.

8. The rollable optical fiber ribbon of claim 1, wherein the at least one coating comprises a primary coating contacting and surrounding the cladding and a secondary coating contacting and surrounding the primary coating and wherein the outer surface at which the outer diameter is measured is of the secondary coating.

9. The rollable optical fiber ribbon of claim 8, wherein the primary coating has a diameter of ≤165 microns.

10. The rollable optical fiber ribbon of claim 8, wherein the primary coating comprises a modulus of elasticity of ≤0.5 MPa and a glass transition temperature of −25° C. to −35° C.

11. The rollable optical fiber ribbon of claim 8, wherein the secondary coating comprises a modulus of elasticity of at least 1700 MPa and a puncture resistance load of at least 25 g.

12. The rollable optical fiber ribbon of claim 1, wherein the cladding comprises a depressed cladding index region and an outer cladding region and wherein a first index of refraction in the depressed cladding index region is less than a second index of refraction in the outer cladding region.

13. The rollable optical fiber ribbon of claim 12, wherein the cladding further comprises an inner cladding region such that the depressed cladding index region is between the inner cladding region and the outer cladding region and wherein a third index of refraction in the inner cladding region is greater than the first index of refraction in the depressed cladding index region.

14. The rollable optical fiber ribbon of claim 12, wherein the second index of refraction is substantially constant across the depressed cladding index region.

15. The rollable optical fiber ribbon of claim 12, wherein the depressed cladding index region comprises a width of 4 microns to 22 microns.

16. The rollable optical fiber ribbon of claim 2, wherein the plurality of discreet bridges alternate between upper bridges on a first side of the optical fiber ribbon and lower bridges on a second side of the optical fiber ribbon opposite to the first side.

\* \* \* \* \*

UNITED STATES PATENT AND TRADEMARK OFFICE
CERTIFICATE OF CORRECTION

PATENT NO. : 11,360,280 B2  
APPLICATION NO. : 17/172579  
DATED : June 14, 2022  
INVENTOR(S) : Dana Craig Bookbinder et al.

Page 1 of 1

It is certified that error appears in the above-identified patent and that said Letters Patent is hereby corrected as shown below:

In the Claims

In Column 40, Lines 4-5, in Claim 4, delete "and polymeric fiber coating the" and insert -- and the --.

Signed and Sealed this
Thirteenth Day of September, 2022

Katherine Kelly Vidal
*Director of the United States Patent and Trademark Office*